US012049822B2

(12) United States Patent
Michalopulos et al.

(10) Patent No.: US 12,049,822 B2
(45) Date of Patent: Jul. 30, 2024

(54) SYSTEMS AND METHODS FOR OILFIELD DRILLING OPERATIONS USING COMPUTER VISION

(71) Applicant: MOTIVE DRILLING TECHNOLOGIES, INC., Dallas, TX (US)

(72) Inventors: George Michalopulos, Tulsa, OK (US); Richard Kulavik, Frisco, TX (US); Todd W. Benson, Dallas, TX (US)

(73) Assignee: MOTIVE DRILLING TECHNOLOGIES, INC., Dallas, TX (US)

( * ) Notice: Subject to any disclaimer, the term of this patent is extended or adjusted under 35 U.S.C. 154(b) by 0 days.

(21) Appl. No.: 17/444,454

(22) Filed: Aug. 4, 2021

(65) Prior Publication Data

US 2021/0366256 A1    Nov. 25, 2021

Related U.S. Application Data

(63) Continuation-in-part of application No. 17/182,100, filed on Feb. 22, 2021, now Pat. No. 11,361,646,
(Continued)

(51) Int. Cl.
*E21B 7/04* (2006.01)
*G06T 7/20* (2017.01)
(Continued)

(52) U.S. Cl.
CPC .................. *E21B 7/04* (2013.01); *G06T 7/20* (2013.01); *G06T 7/70* (2017.01); *G06T 17/00* (2013.01);
(Continued)

(58) Field of Classification Search
CPC ........... G06T 7/70; G06T 7/246; G06T 7/292; H04N 5/247; H04N 7/181; G06V 10/764
See application file for complete search history.

(56) References Cited

U.S. PATENT DOCUMENTS 3,831,680 A   8/1974   Edwards et al.
4,610,005 A   9/1986   Utasi
(Continued)

FOREIGN PATENT DOCUMENTS

GB    2522922 A    8/2015
GB    2532272 A    5/2016
(Continued)

OTHER PUBLICATIONS

U.S. Appl. No. 17/182,100, "Final Office Action", Oct. 21, 2021, 24 pages.
(Continued)

*Primary Examiner* — Boubacar Abdou Tchoussou
(74) *Attorney, Agent, or Firm* — Kilpatrick Townsend & Stockton LLP

(57) ABSTRACT

Computer vision drilling systems and methods may be used with a drilling rig. The computer vision systems and methods may automatically monitor the drilling site and drilling operations, and may tally pipe in the drill string and monitor equipment for anomalous drilling conditions, and may automatically take corrective action as may be needed. The computer vision system may detect and identify one or more markings, such as symbols, letters, numbers, or other identifying features, on the pipe. Such features may be encoded on the pipe, such as by being etched or engraved or otherwise marked on the pipe, and may uniquely identify each pipe. The system can monitor and record the drilling conditions to which each pipe is exposed during drilling, which can be used to determine, among other things,
(Continued)

whether and to what extent the pipe can be expected to have a useful life.

17 Claims, 18 Drawing Sheets

Related U.S. Application Data which is a continuation of application No. 16/660,250, filed on Oct. 22, 2019, now Pat. No. 10,957,177.

(60) Provisional application No. 62/748,996, filed on Oct. 22, 2018.

(51) Int. Cl.
| | | |
|---|---|---|
| *G06T 7/70* | (2017.01) | |
| *G06T 17/00* | (2006.01) | |
| *G06V 10/764* | (2022.01) | |
| *G06V 20/52* | (2022.01) | |
| *G06V 40/10* | (2022.01) | |
| *G08B 7/06* | (2006.01) | |
| *G08B 21/02* | (2006.01) | |
| *H04N 7/18* | (2006.01) | |
| *H04N 23/90* | (2023.01) | |

(52) U.S. Cl.
CPC ............ *G06V 10/764* (2022.01); *G06V 40/10* (2022.01); *G06V 40/103* (2022.01); *G08B 7/06* (2013.01); *G08B 21/02* (2013.01); *H04N 7/181* (2013.01); *H04N 23/90* (2023.01); *G06V 20/52* (2022.01)

(56) References Cited

U.S. PATENT DOCUMENTS

| | | | |
|---|---|---|---|
| 4,658,903 | A | 4/1987 | Tateishi |
| 4,914,591 | A | 4/1990 | Warren et al. |
| 6,469,734 | B1 | 10/2002 | Nichani et al. |
| 6,868,920 | B2 | 3/2005 | Hoteit et al. |
| 7,802,634 | B2 | 9/2010 | Boone |
| 7,823,655 | B2 | 11/2010 | Boone et al. |
| 7,860,593 | B2 | 12/2010 | Boone |
| 7,874,351 | B2 | 1/2011 | Hampton et al. |
| 7,933,166 | B2 | 4/2011 | Goodman |
| 7,938,197 | B2 | 5/2011 | Boone et al. |
| 8,210,283 | B1 | 7/2012 | Benson et al. |
| 8,218,826 | B2 | 7/2012 | Ciglenec et al. |
| 8,233,667 | B2 | 7/2012 | Helgason et al. |
| 8,360,171 | B2 | 1/2013 | Boone et al. |
| 8,363,101 | B2 | 1/2013 | Gschwendtner et al. |
| 8,395,661 | B1 | 3/2013 | Olsson et al. |
| 8,510,081 | B2 | 8/2013 | Boone et al. |
| 8,528,663 | B2 | 9/2013 | Boone |
| 8,547,428 | B1 | 10/2013 | Olsson et al. |
| 8,622,128 | B2 | 1/2014 | Hegeman |
| 8,812,236 | B1 | 8/2014 | Freeman et al. |
| 8,873,806 | B2 | 10/2014 | Kiest, Jr. |
| 9,041,794 | B1 | 5/2015 | Olsson et al. |
| 9,134,255 | B1 | 9/2015 | Olsson et al. |
| 9,279,319 | B2 | 3/2016 | Savage |
| 9,410,877 | B2 | 8/2016 | Maxey et al. |
| 9,464,492 | B2 | 10/2016 | Austefjord et al. |
| 9,494,030 | B2 | 11/2016 | Benson et al. |
| 9,518,817 | B2 | 12/2016 | Baba et al. |
| 9,651,468 | B2 | 5/2017 | Rowe et al. |
| 9,664,011 | B2 | 5/2017 | Kruspe et al. |
| 9,677,882 | B2 | 6/2017 | Kiest, Jr. |
| 9,706,185 | B2 | 7/2017 | Ellis |
| 9,869,145 | B2 | 1/2018 | Jones et al. |
| 9,912,918 | B2 | 3/2018 | Samuel |
| 9,915,112 | B2 | 3/2018 | Geehan et al. |
| 10,227,859 | B2 | 3/2019 | Richards et al. |
| 10,328,503 | B2 | 6/2019 | Osawa et al. |
| 10,567,735 | B2 | 2/2020 | Ellis et al. |
| 10,672,154 | B2 | 6/2020 | Gillen et al. |
| 10,760,403 | B2 | 9/2020 | Ellis et al. |
| 10,900,341 | B2 | 1/2021 | Brannigan et al. |
| 10,957,177 | B2 | 3/2021 | Michalopulos et al. |
| 10,958,877 | B2 | 3/2021 | Torrione et al. |
| 10,982,950 | B2 | 4/2021 | Torrione |
| 11,136,876 | B1 | 10/2021 | Coley |
| 11,361,646 | B2 | 6/2022 | Michalopulos et al. |
| 2003/0118230 | A1* | 6/2003 | Song ................ E21B 19/22 382/152 |
| 2004/0124009 | A1 | 7/2004 | Hoteit et al. |
| 2009/0110107 | A1 | 4/2009 | Abdallah |
| 2009/0159294 | A1 | 6/2009 | Abdollahi et al. |
| 2009/0192731 | A1 | 7/2009 | De Jesus et al. |
| 2011/0093876 | A1 | 4/2011 | Belz et al. |
| 2013/0076907 | A1 | 3/2013 | Hobbs et al. |
| 2013/0236064 | A1 | 9/2013 | Li et al. |
| 2013/0265409 | A1 | 10/2013 | Tjhang et al. |
| 2013/0275100 | A1 | 10/2013 | Ellis et al. |
| 2013/0340998 | A1* | 12/2013 | Flusche ................ E21B 19/24 166/65.1 |
| 2014/0002617 | A1 | 1/2014 | Zhang et al. |
| 2014/0116776 | A1 | 5/2014 | Marx et al. |
| 2014/0326505 | A1 | 11/2014 | Davis et al. |
| 2014/0333754 | A1 | 11/2014 | Graves et al. |
| 2015/0075866 | A1 | 3/2015 | Tjhang |
| 2015/0138337 | A1 | 5/2015 | Tjhang et al. |
| 2015/0188984 | A1 | 7/2015 | Mullins |
| 2015/0218936 | A1 | 8/2015 | Maher et al. |
| 2015/0235544 | A1 | 8/2015 | Hernandez et al. |
| 2015/0345261 | A1 | 12/2015 | Kruspe et al. |
| 2015/0365635 | A1 | 12/2015 | Jose et al. |
| 2016/0130889 | A1 | 5/2016 | Torrione |
| 2016/0130917 | A1 | 5/2016 | Torrione |
| 2016/0134843 | A1 | 5/2016 | Torrione et al. |
| 2016/0292513 | A1 | 10/2016 | Kozicz et al. |
| 2016/0305230 | A1 | 10/2016 | Benson et al. |
| 2017/0089153 | A1 | 3/2017 | Teodorescu |
| 2017/0138171 | A1 | 5/2017 | Richards et al. |
| 2017/0145807 | A1 | 5/2017 | Wendorf et al. |
| 2017/0161885 | A1 | 6/2017 | Parmeshwar et al. |
| 2017/0167853 | A1 | 6/2017 | Zheng et al. |
| 2017/0314369 | A1 | 11/2017 | Rosano et al. |
| 2017/0322086 | A1 | 11/2017 | Luharuka et al. |
| 2018/0180524 | A1 | 6/2018 | Francois et al. |
| 2019/0003297 | A1 | 1/2019 | Brannigan et al. |
| 2019/0024485 | A1 | 1/2019 | Stromme et al. |
| 2019/0048707 | A1 | 2/2019 | Benson et al. |
| 2019/0100988 | A1 | 4/2019 | Ellis et al. |
| 2019/0102612 | A1 | 4/2019 | Takemoto et al. |
| 2019/0136650 | A1 | 5/2019 | Zheng et al. |
| 2019/0141294 | A1 | 5/2019 | Thorn et al. |
| 2019/0206068 | A1 | 7/2019 | Stark et al. |
| 2020/0126386 | A1 | 4/2020 | Michalopulos et al. |
| 2021/0002995 | A1* | 1/2021 | Botnan ................ E21B 19/165 |
| 2021/0115742 | A1 | 4/2021 | Agarwal et al. |
| 2021/0285315 | A1 | 9/2021 | Coley |

FOREIGN PATENT DOCUMENTS

| | | |
|---|---|---|
| WO | 2016147045 A1 | 9/2016 |
| WO | 2017042677 A1 | 3/2017 |
| WO | 2017132297 A2 | 8/2017 |
| WO | 2017176689 A1 | 10/2017 |
| WO | 2018093273 A1 | 5/2018 |
| WO | 2018131485 A1 | 7/2018 |
| WO | 2018148832 A1 | 8/2018 |
| WO | 2018157513 A1 | 9/2018 |

OTHER PUBLICATIONS

U.S. Appl. No. 17/182,100, "Notice of Allowance", Feb. 18, 2022, 7 pages.

Chengtian, et al., "Automatic Identification of Oil Sucker Pipe Using Character Coding", IEEE Youth Conference on Information, Computing and Telecommunication, Sep. 1, 2009, pp. 379-382.

(56) References Cited

OTHER PUBLICATIONS

European Patent Application No. 19874928.5, "Extended European Search Report", Mar. 29, 2022, 9 pages.
International Application No. PCT/US2021/071103, "International Search Report and Written Opinion", Nov. 15, 2021, 12 pages.
U.S. Appl. No. 16/660,250, "Non-Final Office Action", Apr. 28, 2020, 20 pages.
U.S. Appl. No. 16/660,250, "Notice of Allowance", Nov. 20, 2020, 17 pages.
U.S. Appl. No. 16/660,250, "Notice of Allowance", Sep. 16, 2020, 17 pages.
U.S. Appl. No. 17/182,100, "Non-Final Office Action", Jun. 30, 2021, 22 pages.
Harold, et al., "Literature Survey and Background Studies Report (Task V)", RPSEA, Jul. 15, 2014, 90 pages.
International Application No. PCT/US2019/057454, "International Preliminary Report on Patentability", May 6, 2021, 12 pages.
International Application No. PCT/US2019/057454, "International Search Report and Written Opinion", Jan. 13, 2020, 13 pages.
U.S. Appl. No. 17/664,004, "Non-Final Office Action", Dec. 19, 2022, 18 pages.
EP19874928.5, "Office Action", Jan. 27, 2023, 4 pages.
U.S. Appl. No. 17/664,004, "Advisory Action", Jul. 24, 2023, 4 pages.
U.S. Appl. No. 17/664,004, "Final Office Action", May 5, 2023, 17 pages.
U.S. Appl. No. 17/664,004, "Non Final Office Action", mailed on Aug. 4, 2023, 15 pages.
U.S. Appl. No. 17/664,004, "Notice of Allowance", Feb. 20, 2024, 7 pages.
EP Application No. 19874928.5, "Office Action", Jan. 26, 2024, 5 pages.
International Application No. PCT/US2021/071103, "International Preliminary Report on Patentability", Feb. 15, 2024, 11 pages.

\* cited by examiner

SYSTEMS AND METHODS FOR OILFIELD DRILLING OPERATIONS USING COMPUTER VISION

CROSS-REFERENCES TO RELATED APPLICATIONS

This application is a continuation-in-part of U.S. patent application Ser. No. 17/182,100, filed Feb. 22, 2021, entitled SYSTEMS AND METHODS FOR OILFIELD DRILLING OPERATIONS USING COMPUTER VISION, which is a continuation application of U.S. patent application Ser. No. 16/660,250, filed Oct. 22, 2019, now U.S. Pat. No. 10,957, 177, issued Mar. 23, 2021, entitled SYSTEMS AND METHODS FOR OILFIELD DRILLING OPERATIONS USING COMPUTER VISION, which claims the benefit of priority to U.S. Patent Application Ser. No. 62/748,996, filed on Oct. 22, 2018, and entitled "SYSTEMS AND METHODS FOR OILFIELD DRILLING OPERATIONS USING COMPUTER VISION," all of which are incorporated by their entireties for all purposes.

BACKGROUND

Field of the Disclosure

This application is directed to systems and methods for oilfield operations using computer vision, and more particularly, to the management and safe operation of oil drilling equipment and to controlling drilling of oil gas wells. The systems and methods can be computer-implemented using processor executable instructions for execution on a processor and can accordingly be executed with a programmed computer system.

Description of the Related Art

Drilling a borehole for the extraction of minerals has become an increasingly complicated operation due to the increased depth and complexity of many boreholes, including the complexity added by directional drilling. Drilling is an expensive operation and errors in drilling add to the cost and, in some cases, drilling errors may permanently lower the output of a well for years into the future. Many systems exist for improving some aspects of drilling operations, including through enhanced management of various aspects of drilling operations, such as is disclosed in U.S. patent application Ser. No. 14/314,697, entitled "System and Method for Surface Steerable Drilling" (patented as U.S. Pat. No. 9,494,030), U.S. patent application Ser. No. 15/196, 242, entitled "System and Method for Detection of Slide and Rotation Modes" (published as US 2016/0305230 A1), U.S. Provisional Application 62/619,242, entitled "System and Method for Managing Drilling Mud and Additives", and U.S. Provisional Application 62/689,631, entitled "System and Method for Well Drilling Control Based on Borehole Cleaning," all of which are incorporated by reference for all purposes as if fully set forth herein.

Drilling is also a complex operation involving heavy equipment operating in close proximity to drilling personnel, and can therefore also be a dangerous operation if not planned and performed for safety. Drilling personnel not only operate equipment remotely, but often manually perform operations, such as removing drilling slips, or screwing/unscrewing various components and pipes from the drill string. Example drilling procedures and personnel are described in, for example, U.S. Pat. No. 8,210,283, entitled "System and Method for Surface Steerable Drilling," which is incorporated by reference for all purposes as if fully set forth herein. Current technologies and methods do not adequately address the complicated nature of drilling. Accordingly, what is needed are systems and methods to improve supervision and control of drilling operations and improve drilling rig safety.

Computer vision, or video analytics, is one such technology that may have promise for drilling operations and drilling safety. Examples of such technologies include those described in U.S. Published Patent Application 2016/0130889 A1, entitled "System and method for locating, measuring, counting, and aiding in the handling of drill pipes," U.S. Pat. No. 9,908,148, entitled "System and method for measuring fluid front position on shale shakers," U.S. Published Application 2016/0134843 A1, entitled "System and method for inhibiting or causing automated actions based on persons locations estimated from multiple video sources," and U.S. Published Patent Application 2016/0130917 A1, entitled "System and method for estimating rig state using computer vision for time and motion studies," all of which are incorporated by reference for all purposes as if fully set forth herein. Additional improvements to drilling operations are described in this disclosure.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
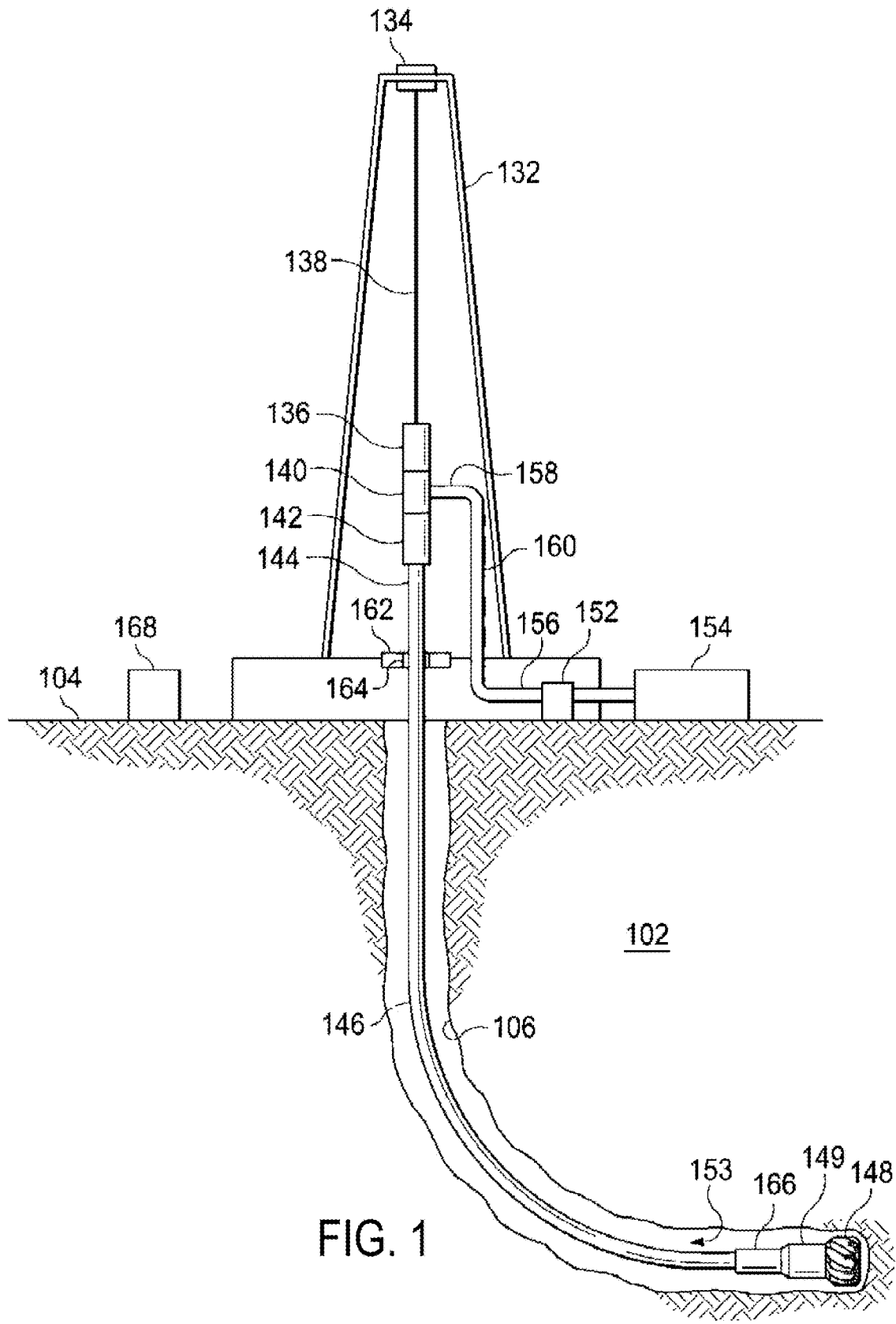
FIG. 1 is a depiction of a drilling system for drilling a borehole.

Although example embodiments of the present disclosure are explained in detail, it is to be understood that other embodiments are contemplated. Accordingly, it is not intended that the present disclosure be limited in its scope to the details of construction and arrangement of components set forth in the following description. The present disclosure is capable of other embodiments and of being practiced or carried out in various ways.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

It is noted that, as used in the specification and the appended claims, the singular forms "a," "an" and "the" include plural referents unless the context clearly dictates otherwise. Moreover, titles or subtitles may be used in this specification for the convenience of a reader, which shall have no influence on the scope of the present disclosure.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose.

It is to be understood that the mention of one or more steps of a method does not preclude the presence of additional method steps or intervening method steps between those steps expressly identified. Steps of a method may be performed in a different order than those described herein. Similarly, it is also to be understood that the mention of one or more components in a device or system does not preclude the presence of additional components or intervening components between those components expressly identified.

Drilling a well typically involves a substantial amount of human decision-making during the drilling process. For example, geologists and drilling engineers use their knowledge, experience, and the available information to make decisions on how to plan the drilling operation, how to accomplish the drilling plan, and how to handle issues that arise during drilling. However, even the best geologists and drilling engineers perform some guesswork due to the unique nature of each borehole. Furthermore, a directional human driller performing the drilling may have drilled other boreholes in the same region and so may have some similar experience. However, during drilling operations, a multitude of input information and other factors may affect a drilling decision being made by a human operator or specialist, such that the amount of information may overwhelm the cognitive ability of the human to properly consider and factor into the drilling decision. Furthermore, the quality or the error involved with the drilling decision may improve with larger amounts of input data being considered, for example, such as formation data from a large number of offset wells. For these reasons, human specialists may be unable to achieve desirable drilling decisions, particularly when such drilling decisions are made under time constraints, such as during drilling operations when continuation of drilling is dependent on the drilling decision and, thus, the entire drilling rig waits idly for the next drilling decision. Furthermore, human decision-making for drilling decisions can result in expensive mistakes, because drilling errors can add significant cost to drilling operations. In some cases, drilling errors may permanently lower the output of a well, resulting in substantial long term economic losses due to the lost output of the well.

Therefore, the well plan may be updated based on new stratigraphic information from the wellbore, as it is being drilled. This stratigraphic information can be gained on one hand from measurement while drilling (MWD) and logging while drilling (LWD) sensor data, but could also include other reference well data, such as drilling dynamics data or sensor data giving information, for example, on the hardness of the rock in individual strata layers being drilled through.

A method for updating the well plan with additional stratigraphic data may first combine the various parameters into a single characteristic function, both for the subject well and every offset well. For every pair of subject well and offset well, a heat map can be computed to display the misfit between the characteristic functions of the subject and offset wells. The heat maps may then enable the identification of paths (x(MD), y(MD)), parameterized by the measured depth (MD) along the subject well. These paths uniquely describe the vertical depth of the subject well relative to the geology (e.g., formation) at every offset well. Alternatively, the characteristic functions of the offset wells can be combined into a single characteristic function at the location of the subject wellbore. This combined characteristic function changes along the subject well with changes in the stratigraphy. The heat map may also be used to identify stratigraphic anomalies, such as structural faults, stringers and breccia. The identified paths may be used in updating the well plan with the latest data to steer the wellbore into the geological target(s) and keep the wellbore in the target zone.

Referring now to the drawings, Referring to FIG. 1, a drilling system 100 is illustrated in one embodiment as a top drive system. As shown, the drilling system 100 includes a derrick 132 on the surface 104 of the earth and is used to drill a borehole 106 into the earth. Typically, drilling system 100 is used at a location corresponding to a geographic formation 102 in the earth that is known.

In FIG. 1, derrick 132 includes a crown block 134 to which a travelling block 136 is coupled via a drilling line 138. In drilling system 100, a top drive 140 is coupled to travelling block 136 and may provide rotational force for drilling. A saver sub 142 may sit between the top drive 140 and a drill pipe 144 that is part of a drill string 146. Top drive 140 may rotate drill string 146 via the saver sub 142, which in turn may rotate a drill bit 148 of a bottom hole assembly (BHA) 149 in borehole 106 passing through formation 102. Also visible in drilling system 100 is a rotary table 162 that may be fitted with a master bushing 164 to hold drill string 146 when not rotating.

A mud pump 152 may direct a fluid mixture 153 (e.g., a mud mixture) from a mud pit 154 into drill string 146. Mud pit 154 is shown schematically as a container, but it is noted that various receptacles, tanks, pits, or other containers may be used. Mud 153 may flow from mud pump 152 into a discharge line 156 that is coupled to a rotary hose 158 by a standpipe 160. Rotary hose 158 may then be coupled to top drive 140, which includes a passage for mud 153 to flow into borehole 106 via drill string 146 from where mud 153 may emerge at drill bit 148. Mud 153 may lubricate drill bit 148 during drilling and, due to the pressure supplied by mud pump 152, mud 153 may return via borehole 106 to surface 104.

In drilling system 100, drilling equipment (see also FIG. 5) is used to perform the drilling of borehole 106, such as top drive 140 (or rotary drive equipment) that couples to drill string 146 and BHA 149 and is configured to rotate drill string 146 and apply pressure to drill bit 148. Drilling system 100 may include control systems such as a WOB/differential pressure control system 522, a positional/rotary control system 524, a fluid circulation control system 526, and a sensor system 528, as further described below with respect to FIG. 5. The control systems may be used to monitor and change drilling rig settings, such as the WOB or differential pressure to alter the ROP or the radial orientation of the toolface, change the flow rate of drilling mud, and perform other operations. Sensor system 528 may be for obtaining sensor data about the drilling operation and drilling system 100, including the downhole equipment. For example, sensor system 528 may include MWD or logging while drilling (LWD) tools for acquiring information, such as toolface and formation logging information, that may be saved for later retrieval, transmitted with or without a delay using any of various communication means (e.g., wireless, wireline, or mud pulse telemetry), or otherwise transferred to steering control system 168. As used herein, an MWD tool is enabled to communicate downhole measurements without substantial delay to the surface 104, such as using mud pulse telemetry, while a LWD tool is equipped with an internal memory that stores measurements when downhole and can be used to download a stored log of measurements when the LWD tool is at the surface 104. The internal memory in the LWD tool may be a removable memory, such as a universal serial bus (USB) memory device or another removable memory device. It is noted that certain downhole tools may have both MWD and LWD capabilities. Such information acquired by sensor system 528 may include information related to hole depth, bit depth, inclination angle, azimuth angle, true vertical depth, gamma count, standpipe pressure, mud flow rate, rotary rotations per minute (RPM), bit speed, ROP, WOB, among other information. It is noted that all or part of sensor system 528 may be incorporated into a control system, or in another component of the drilling equipment. As drilling system 100 can be configured in many different implementations, it is noted that different control systems and subsystems may be used.

Sensing, detection, measurement, evaluation, storage, alarm, and other functionality may be incorporated into a downhole tool 166 or BHA 149 or elsewhere along drill string 146 to provide downhole surveys of borehole 106. Accordingly, downhole tool 166 may be an MWD tool or a LWD tool or both, and may accordingly utilize connectivity to the surface 104, local storage, or both. In different implementations, gamma radiation sensors, magnetometers, accelerometers, and other types of sensors may be used for the downhole surveys. Although downhole tool 166 is shown in singular in drilling system 100, it is noted that multiple instances (not shown) of downhole tool 166 may be located at one or more locations along drill string 146.

In some embodiments, formation detection and evaluation functionality may be provided via a steering control system 168 on the surface 104. Steering control system 168 may be located in proximity to derrick 132 or may be included with drilling system 100. In other embodiments, steering control system 168 may be remote from the actual location of borehole 106 (see also FIG. 4). For example, steering control system 168 may be a stand-alone system or may be incorporated into other systems included with drilling system 100.

In operation, steering control system 168 may be accessible via a communication network (see also FIG. 10), and may accordingly receive formation information via the communication network. In some embodiments, steering control system 168 may use the evaluation functionality to provide corrective measures, such as a convergence plan to overcome an error in the well trajectory of borehole 106 with respect to a reference, or a planned well trajectory. The convergence plans or other corrective measures may depend on a determination of the well trajectory, and therefore, may be improved in accuracy using surface steering, as disclosed herein.

In particular embodiments, at least a portion of steering control system 168 may be located in downhole tool 166 (not shown). In some embodiments, steering control system 168 may communicate with a separate controller (not shown) located in downhole tool 166. In particular, steering control system 168 may receive and process measurements received from downhole surveys, and may perform the calculations described herein for surface steering using the downhole surveys and other information referenced herein.

In drilling system 100, to aid in the drilling process, data is collected from borehole 106, such as from sensors in BHA 149, downhole tool 166, or both. The collected data may include the geological characteristics of formation 102 in which borehole 106 was formed, the attributes of drilling system 100, including BHA 149, and drilling information such as weight-on-bit (WOB), drilling speed, and other information pertinent to the formation of borehole 106. The drilling information may be associated with a particular depth or another identifiable marker to index collected data. For example, the collected data for borehole 106 may capture drilling information indicating that drilling of the well from 1,000 feet to 1,200 feet occurred at a first rate of penetration (ROP) through a first rock layer with a first WOB, while drilling from 1,200 feet to 1,500 feet occurred at a second ROP through a second rock layer with a second WOB (see also FIG. 2). in some applications, the collected data may be used to virtually recreate the drilling process that created borehole 106 in formation 102, such as by displaying a computer simulation of the drilling process. The accuracy with which the drilling process can be recreated depends on a level of detail and accuracy of the collected data, including collected data from a downhole survey of the well trajectory.

The collected data may be stored in a database that is accessible via a communication network for example. In some embodiments, the database storing the collected data for borehole 106 may be located locally at drilling system 100, at a drilling hub that supports a plurality of drilling systems 100 in a region, or at a database server accessible over the communication network that provides access to the database (see also FIG. 4). At drilling system 100, the collected data may be stored at the surface 104 or downhole in drill string 146, such as in a memory device included with BHA 149 (see also FIG. 10). Alternatively, at least a portion of the collected data may be stored on a removable storage medium, such as using steering control system 168 or BHA 149, that is later coupled to the database in order to transfer the collected data to the database, which may be manually performed at certain intervals, for example.

In FIG. 1, steering control system 168 is located at or near the surface 104 where borehole 106 is being drilled. Steering control system 168 may be coupled to equipment used in drilling system 100 and may also be coupled to the database, whether the database is physically located locally, regionally, or centrally (see also FIGS. 4 and 5). Accordingly, steering control system 168 may collect and record various inputs, such as measurement data from a magnetometer and an accelerometer that may also be included with BHA 149.

Steering control system 168 may further be used as a surface steerable system, along with the database, as described above. The surface steerable system may enable an operator to plan and control drilling operations while drilling is being performed. The surface steerable system may itself also be used to perform certain drilling operations, such as controlling certain control systems that, in turn, control the actual equipment in drilling system 100 (see also FIG. 5). The control of drilling equipment and drilling operations by steering control system 168 may be manual, manual-assisted, semi-automatic, or automatic, in different embodiments.

Manual control may involve direct control of the drilling rig equipment, albeit with certain safety limits to prevent unsafe or undesired actions or collisions of different equipment. To enable manual-assisted control, steering control system 168 may present various information, such as using a graphical user interface (GUI) displayed on a display device (see FIG. 8), to a human operator, and may provide controls that enable the human operator to perform a control operation. The information presented to the user may include live measurements and feedback from the drilling rig and steering control system 168, or the drilling rig itself, and may further include limits and safety-related elements to prevent unwanted actions or equipment states, in response to a manual control command entered by the user using the GUI.

To implement semi-automatic control, steering control system 168 may itself propose or indicate to the user, such as via the GUI, that a certain control operation, or a sequence of control operations, should be performed at a given time. Then, steering control system 168 may enable the user to imitate the indicated control operation or sequence of control operations, such that once manually started, the indicated control operation or sequence of control operations is automatically completed. The limits and safety features mentioned above for manual control would still apply for semi-automatic control. It is noted that steering control system 168 may execute semi-automatic control using a secondary processor, such as an embedded controller that executes under a real-time operating system (RTOS), that is under the control and command of steering control system 168. To implement automatic control, the step of manual starting the indicated control operation or sequence of operations is eliminated, and steering control system 168 may proceed with only a passive notification to the user of the actions taken.

In order to implement various control operations, steering control system 168 may perform (or may cause to be performed) various input operations, processing operations, and output operations. The input operations performed by steering control system 168 may result in measurements or other input information being made available for use in any subsequent operations, such as processing or output operations. The input operations may accordingly provide the input information, including feedback from the drilling process itself, to steering control system 168. The processing operations performed by steering control system 168 may be any processing operation associated with surface steering, as disclosed herein. The output operations performed by steering control system 168 may involve generating output information for use by external entities, or for output to a user, such as in the form of updated elements in the GUI, for example. The output information may include at least some of the input information, enabling steering control system 168 to distribute information among various entities and processors.

In particular, the operations performed by steering control system 168 may include operations such as receiving drilling data representing a drill path, receiving other drilling parameters, calculating a drilling solution for the drill path based on the received data and other available data (e.g., rig characteristics), implementing the drilling solution at the drilling rig, monitoring the drilling process to gauge whether the drilling process is within a defined margin of error of the drill path, and calculating corrections for the drilling process if the drilling process is outside of the margin of error.

Accordingly, steering control system 168 may receive input information either before drilling, during drilling, or after drilling of borehole 106. The input information may comprise measurements from one or more sensors, as well as survey information collected while drilling borehole 106. The input information may also include a well plan, a regional formation history, drilling engineer parameters, downhole tool face/inclination information, downhole tool gamma/resistivity information, economic parameters, reliability parameters, among various other parameters. Some of the input information, such as the regional formation history, may be available from a drilling huh 410, which may have respective access to a regional drilling database (DB) 412 (see FIG. 4). Other input information may be accessed or uploaded from other sources to steering control system 168. For example, a web interface may be used to interact directly with steering control system 168 to upload the well plan or drilling parameters.

As noted, the input information may be provided to steeling control system 168. After processing by steering control system 168, steering control system 168 may generate control information that may be output to drilling rig 210 (e.g., to rig controls 520 that control drilling equipment 530, see also FIGS. 2 and 5). Drilling rig 210 may provide feedback information using rig controls 520 to steering control system 168. The feedback information may then serve as input information to steering control system 168, thereby enabling steering control system 168 to perform feedback loop control and validation. Accordingly, steering control system 168 may be configured to modify its output information to drilling rig 210, in order to achieve the desired results, which are indicated in the feedback information. The output information generated by steeling control system 168 may include indications to modify one or more drilling parameters, the direction of drilling, the drilling mode, among others. In certain operational modes, such as semi-automatic or automatic, steering control system 168 may generate output information indicative of instructions to rig controls 520 to enable automatic drilling using the latest location of BHA 149. Therefore, an improved accuracy in the determination of the location of BHA 149 may be provided using steering control system 168, along with the methods and operations for surface steering disclosed herein.

Figure 2:
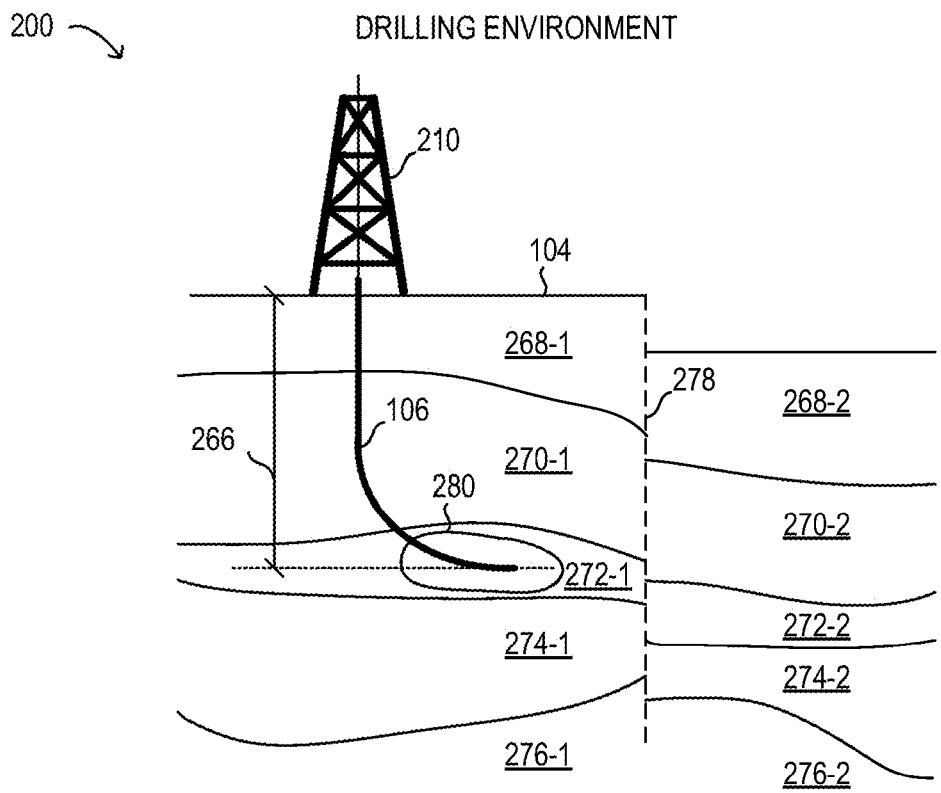
FIG. 2 is a depiction of a drilling environment including the drilling system for drilling a borehole.

Referring now to FIG. 2, a drilling environment 200 is depicted schematically and is not drawn to scale or perspective. In particular, drilling environment 200 may illustrate additional details with respect to formation 102 below the surface 104 in drilling system 100 shown in FIG. 1. In FIG. 2, drilling rig 210 may represent various equipment discussed above with respect to drilling system 100 in FIG. 1 that is located at the surface 104.

In drilling environment 200, it may be assumed that a drilling plan (also referred to as a well plan) has been formulated to drill borehole 106 extending into the ground to a true vertical depth (TVD) 266 and penetrating several subterranean strata layers. Borehole 106 is shown in FIG. 2 extending through strata layers 268-1 and 270-1, while terminating in strata layer 272-1. Accordingly, as shown, borehole 106 does not extend or reach underlying strata. layers 274-1 and 276-1. A target area 280 specified in the drilling plan may be located in strata layer 272-1 as shown in FIG. 2. Target area 280 may represent a desired endpoint of borehole 106, such as a hydrocarbon producing area indicated by strata layer 272-1. It is noted that target area 280 may be of any shape and size, and may be defined using various different methods and information in different embodiments. In some instances, target area 280 may be specified in the drilling plan using subsurface coordinates, or references to certain markers, that indicate where borehole 106 is to be terminated. In other instances, target area may be specified in the drilling plan using a depth range within which borehole 106 is to remain. For example, the depth range may correspond to strata layer 272-1. In other examples, target area 280 may extend as far as can be realistically drilled. For example, when borehole 106 is specified to have a horizontal section with a goal to extend into strata layer 172 as far as possible, target area 280 may be defined as strata layer 272-1 itself and drilling may continue until some other physical limit is reached, such as a property boundary or a physical limitation to the length of drill string 146.

Also visible in FIG. 2 is a fault line 278 that has resulted in a subterranean discontinuity in the fault structure. Specifically, strata layers 268, 270, 272, 274, and 276 have portions on either side of fault line 278. On one side of fault line 278, where borehole 106 is located, strata layers 268-1, 270-1, 272-1, 274-1, and 276-1 are unshifted by fault line 278. On the other side of fault line 278, strata layers 268-2, 270-3, 272-3, 274-3, and 276-3 are shifted downwards by fault line 278.

Current drilling operations frequently include directional drilling to reach a target, such as target area 280. The use of directional drilling has been found to generally increase an overall amount of production volume per well, but also may lead to significantly higher production rates per well, which are both economically desirable. As shown in FIG. 2, directional drilling may be used to drill the horizontal portion of borehole 106, which increases an exposed length of borehole 106 within strata layer 272-1, and which may accordingly be beneficial for hydrocarbon extraction from strata layer 272-1. Directional drilling may also be used alter an angle of borehole 106 to accommodate subterranean faults, such as indicated by fault line 278 in FIG. 2. Other benefits that may be achieved using directional drilling include sidetracking off of an existing well to reach a different target area or a missed target area, drilling around abandoned drilling equipment, drilling into otherwise inaccessible or difficult to reach locations (e.g., under populated areas or bodies of water), providing a relief well for an existing well, and increasing the capacity of a well by branching off and having multiple boreholes extending in different directions or at different vertical positions for the same well. Directional drilling is often not limited to a straight horizontal borehole 106, but may involve staying within a strata layer that varies in depth and thickness as illustrated by strata layer 172. As such, directional drilling may involve multiple vertical adjustments that complicate the trajectory of borehole 106.

Figure 3:
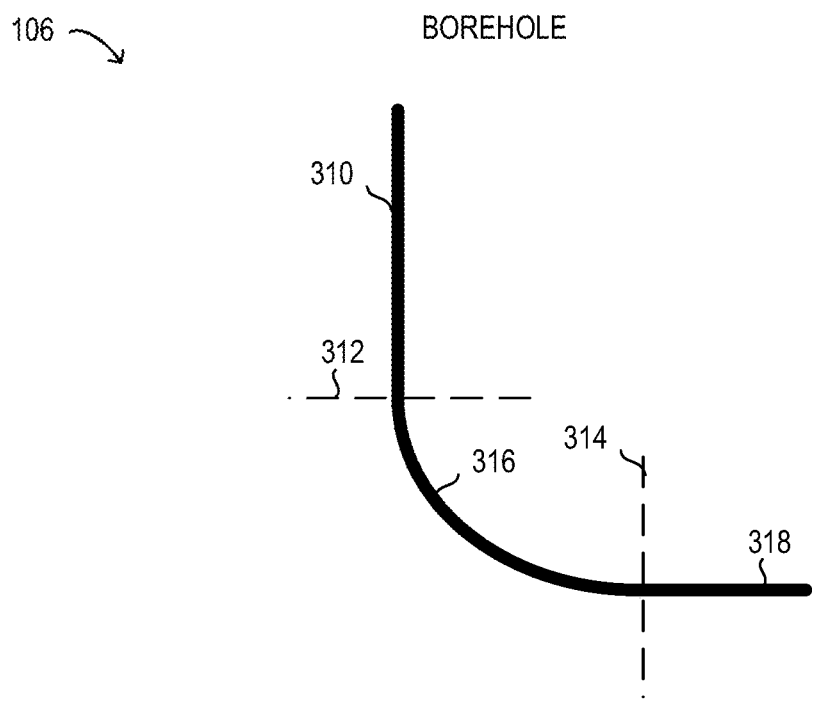
FIG. 3 is a depiction of a borehole generated in the drilling environment.

Referring now to FIG. 3, one embodiment of a portion of borehole 106 is shown in further detail. Using directional drilling for horizontal drilling may introduce certain challenges or difficulties that may not be observed during vertical drilling of borehole 106. For example, a horizontal portion 318 of borehole 106 may be started from a vertical portion 310. In order to make the transition from vertical to horizontal, a curve may be defined that specifies a so-called "build up" section 316. Build up section 316 may begin at a kick off point 312 in vertical portion 310 and may end at a begin point 314 of horizontal portion 318. The change in inclination angle in build up section 316 per measured length drilled is referred to herein as a "build rate" and may be defined in degrees per one hundred feet drilled. For example, the build rate may have a value of 6°/100 ft., indicating that there is a six degree change in inclination angle for every one hundred feet drilled. The build rate for a particular build up section may remain relatively constant or may vary.

The build rate used for any given build up section may depend on various factors, such as properties of the formation (i.e., strata layers) through which borehole 106 is to be drilled, the trajectory of borehole 106, the particular pipe and drill collars/BHA components used (e.g., length, diameter, flexibility, strength, mud motor bend setting, and drill bit), the mud type and flow rate, the specified horizontal displacement, stabilization, and inclination angle, among other factors. An overly aggressive built rate can cause problems such as severe doglegs (e.g., sharp changes in direction in the borehole) that may make it difficult or impossible to run casing or perform other operations in borehole 106. Depending on the severity of any mistakes made during directional drilling, borehole 106 may be enlarged or drill bit 146 may be backed out of a portion of borehole 106 and redrilled along a different path. Such mistakes may be undesirable due to the additional time and expense involved. However, if the built rate is too cautious, additional overall time may be added to the drilling process, because directional drilling generally involves a lower ROP than straight drilling. Furthermore, directional drilling for a curve is more complicated than vertical drilling and the possibility of drilling errors increases with directional drilling (e.g., overshoot and undershoot that may occur while trying to keep drill bit 148 on the planned trajectory).

Two modes of drilling, referred to herein as "rotating" and "sliding", are commonly used to form borehole 106. Rotating, also called "rotary drilling", uses top drive 140 or rotary table 162 to rotate drill string 146. Rotating may be used when drilling occurs along a straight trajectory, such as for vertical portion 310 of borehole 106. Sliding, also called "steering" or "directional drilling" as noted above, typically uses a mud motor located downhole at BHA 149. The mud motor may have an adjustable bent housing and is not powered by rotation of drill string 146. Instead, the mud motor uses hydraulic power derived from the pressurized drilling mud that circulates along borehole 106 to and from the surface 104 to directionally drill borehole 106 in build up section 316.

Thus, sliding is used in order to control the direction of the well trajectory during directional drilling. A method to perform a slide may include the following operations. First, during vertical or straight drilling, the rotation of drill string 146 is stopped. Based on feedback from measuring equipment, such as from downhole tool 166, adjustments may be made to drill string 146, such as using top drive 140 to apply various combinations of torque, WOB, and vibration, among other adjustments. The adjustments may continue until a tool face is confirmed that indicates a direction of the bend of the mud motor is oriented to a direction of a desired deviation (i.e., build rate) of borehole 106. Once the desired orientation of the mud motor is attained, WOB to the drill bit is increased, which causes the drill bit to move in the desired direction of deviation. Once sufficient distance and angle have been built up in the curved trajectory, a transition back to rotating mode can be accomplished by rotating drill string 146 again. The rotation of drill string 146 after sliding may neutralize the directional deviation caused by the bend in the mud motor due to the continuous rotation around a centerline of borehole 106.

Figure 4:
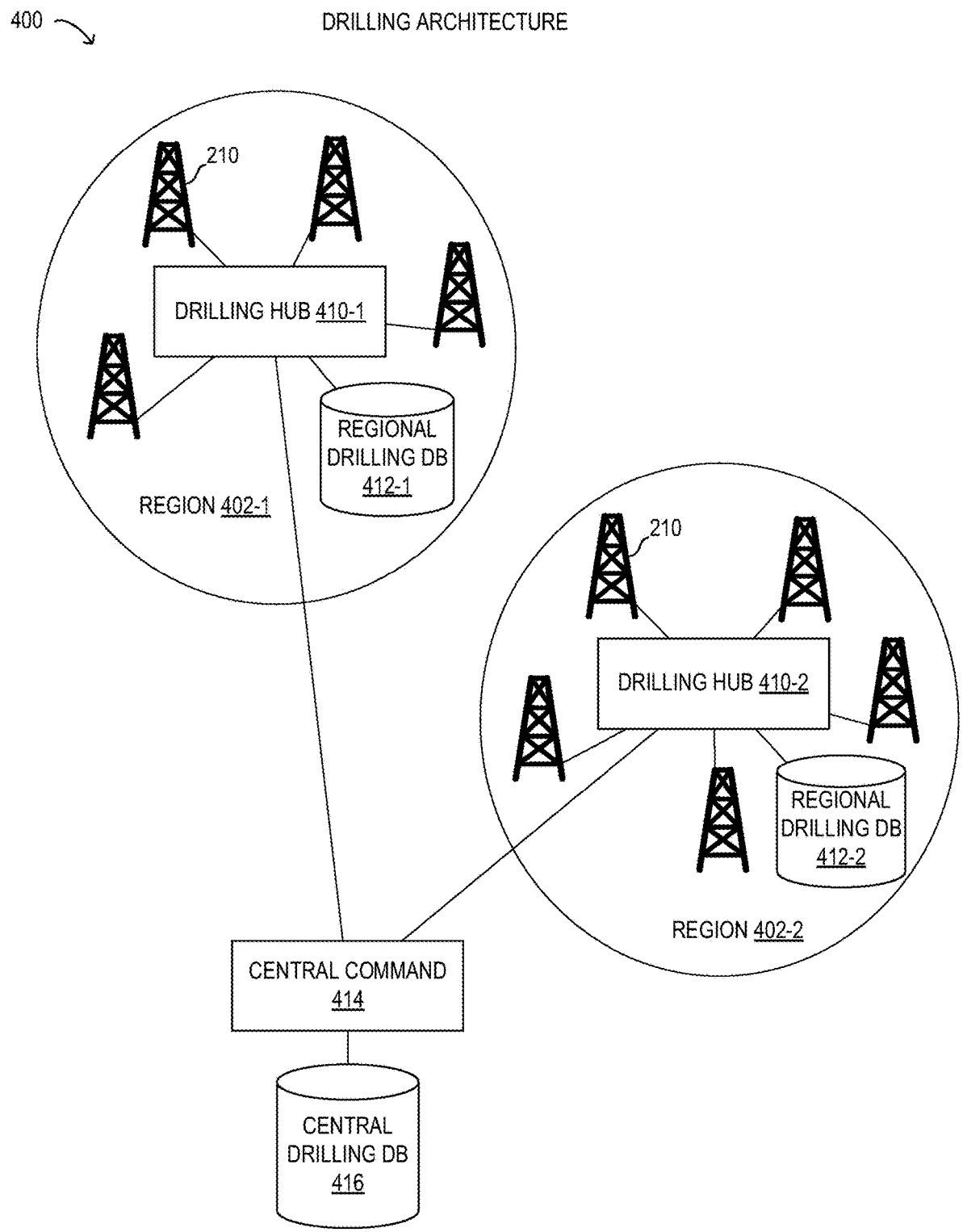
FIG. 4 is a depiction of a drilling architecture including the drilling environment.

Referring now to FIG. 4, a drilling architecture 400 is illustrated in diagram form. As shown, drilling architecture 400 depicts a hierarchical arrangement of drilling hubs 410 and a central command 414, to support the operation of a plurality of drilling rigs 210 in different regions 402. Specifically, as described above with respect to FIGS. 1 and 2, drilling rig 210 includes steering control system 168 that is enabled to perform various drilling control operations locally to drilling rig 210. When steering control system 168 is enabled with network connectivity, certain control operations or processing may be requested or queried by steering control system 168 from a remote processing resource. As shown in FIG. 4, drilling hubs 410 represent a remote processing resource for steering control system 168 located at respective regions 402, while central command 414 may represent a remote processing resource for both drilling hub 410 and steering control system 168.

Specifically, in a region 401-1, a drilling hub 410-1 may serve as a remote processing resource for drilling rigs 210 located in region 401-1, which may vary in number and are not limited to the exemplary schematic illustration of FIG. 4. Additionally, drilling hub 410-1 may have access to a regional drilling DB 412-1, which may be local to drilling hub 410-1. Additionally, in a region 401-2, a drilling hub 410-2 may serve as a remote processing resource for drilling rigs 210 located in region 401-2, which may vary in number and are not limited to the exemplary schematic illustration of HG. 4. Additionally, drilling hub 410-2 may have access to a regional drilling DB 412-2, which may be local to drilling hub 410-2.

In FIG. 4, respective regions 402 may exhibit the same or similar geological formations. Thus, reference wells, or offset wells, may exist in a vicinity of a given drilling rig 210 in region 402, or where a new well is planned in region 402. Furthermore, multiple drilling rigs 210 may be actively drilling concurrently in region 402, and may be in different stages of drilling through the depths of formation strata layers at region 402. Thus, for any given well being drilled by drilling rig 210 in a region 402, survey data from the reference wells or offset wells may be used to create the well plan, and may be used for surface steering, as disclosed herein. In some implementations, survey data or reference data from a plurality of reference wells may be used to improve drilling performance, such as by reducing an error in estimating TVD or a position of BHA 149 relative to one or more strata layers, as will be described in further detail herein. Additionally, survey data from recently drilled wells, or wells still currently being drilled, including the same well, may be used for reducing an error in estimating TVD or a position of BHA 149 relative to one or more strata layers.

Also shown in FIG. 4 is central command 414, which has access to central drilling DB 416, and may be located at a centralized command center that is in communication with drilling hubs 410 and drilling rigs 210 in various regions 402. The centralized command center may have the ability to monitor drilling and equipment activity at any one or more drilling rigs 210. In some embodiments, central command 414 and drilling hubs 412 may be operated by a commercial operator of drilling rigs 210 as a service to customers who have hired the commercial operator to drill wells and provide other drilling-related services.

In FIG. 4, it is particularly noted that central drilling DB 416 may be a central repository that is accessible to drilling hubs 410 and drilling rigs 210. Accordingly, central drilling DB 416 may store information for various drilling rigs 210 in different regions 402. In some embodiments, central drilling DB 416 may serve as a backup for at least one regional drilling DB 412, or may otherwise redundantly store information that is also stored on at least one regional drilling DB 412. In turn, regional drilling DB 412 may serve as a backup or redundant storage for at least one drilling rig 210 in region 402. For example, regional drilling DB 412 may store information collected by steering control system 168 from drilling rig 210.

In some embodiments, the formulation of a drilling plan for drilling rig 210 may include processing and analyzing the collected data in regional drilling DB 412 to create a more effective drilling plan. Furthermore, once the drilling has begun, the collected data may be used in conjunction with current data from drilling rig 210 to improve drilling decisions. As noted, the functionality of steering control system 168 may be provided at drilling rig 210, or may be provided, at least in part, at a remote processing resource, such as drilling hub 410 or central command 414.

As noted, steering control system 168 may provide functionality as a surface steerable system for controlling drilling rig 210. Steering control system 168 may have access to regional drilling DB 412 and central drilling DB 416 to provide the surface steerable system functionality. As will be described in greater detail below, steering control system 168 may be used to plan and control drilling operations based on input information, including feedback from the drilling process itself. Steering control system 168 may be used to perform operations such as receiving drilling data representing a drill trajectory and other drilling parameters, calculating a drilling solution for the drill trajectory based on the received data and other available data (e.g., rig characteristics), implementing the drilling solution at drilling rig 210, monitoring the drilling process to gauge whether the drilling process is within a margin of error that is defined for the drill trajectory, or calculating corrections for the drilling process if the drilling process is outside of the margin of error.

Figure 5:
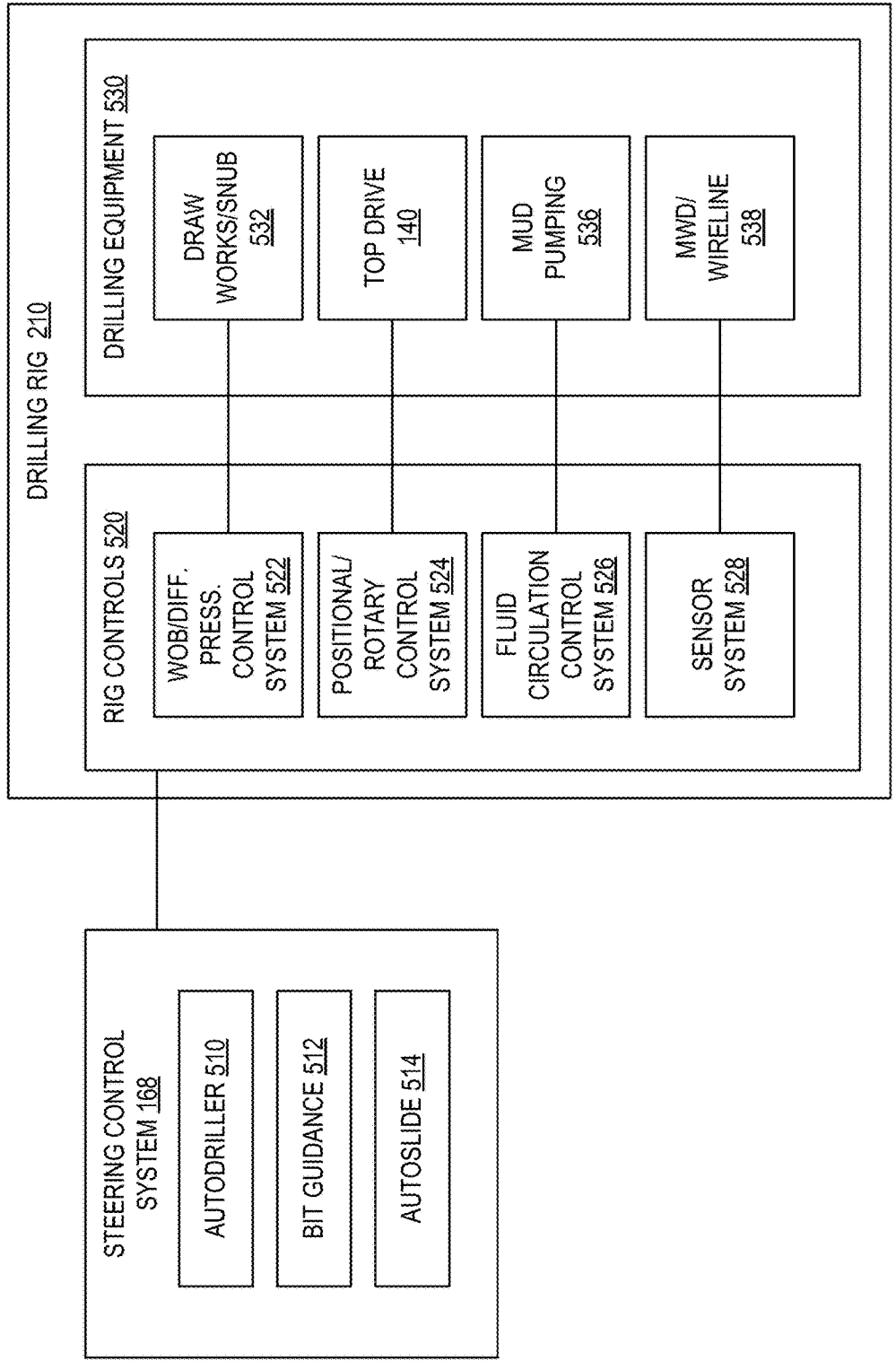
FIG. 5 is a depiction of rig control systems included in the drilling system.

Referring now to FIG. 5, an example of rig control systems 500 is illustrated in schematic form. It is noted that rig control systems 500 may include fewer or more elements than shown in FIG. 5 in different embodiments. As shown, rig control systems 500 includes steering control system 168 and drilling rig 210. Specifically, steering control system 168 is shown with logical functionality including an autodriller 510, a bit guidance 512, and an autoslide 514. Drilling rig 210 is hierarchically shown including rig controls 520, which provide secure control logic and processing capability, along with drilling equipment 530, which represents the physical equipment used for drilling at drilling rig 210. As shown, rig controls 520 include WOB/differential pressure control system 522, positional/rotary control system 524, fluid circulation control system 526, and sensor system 528, while drilling equipment 530 includes a draw works/snub 532, top drive 140, a mud pumping 536, and an MWD/wireline 538.

Figure 10:
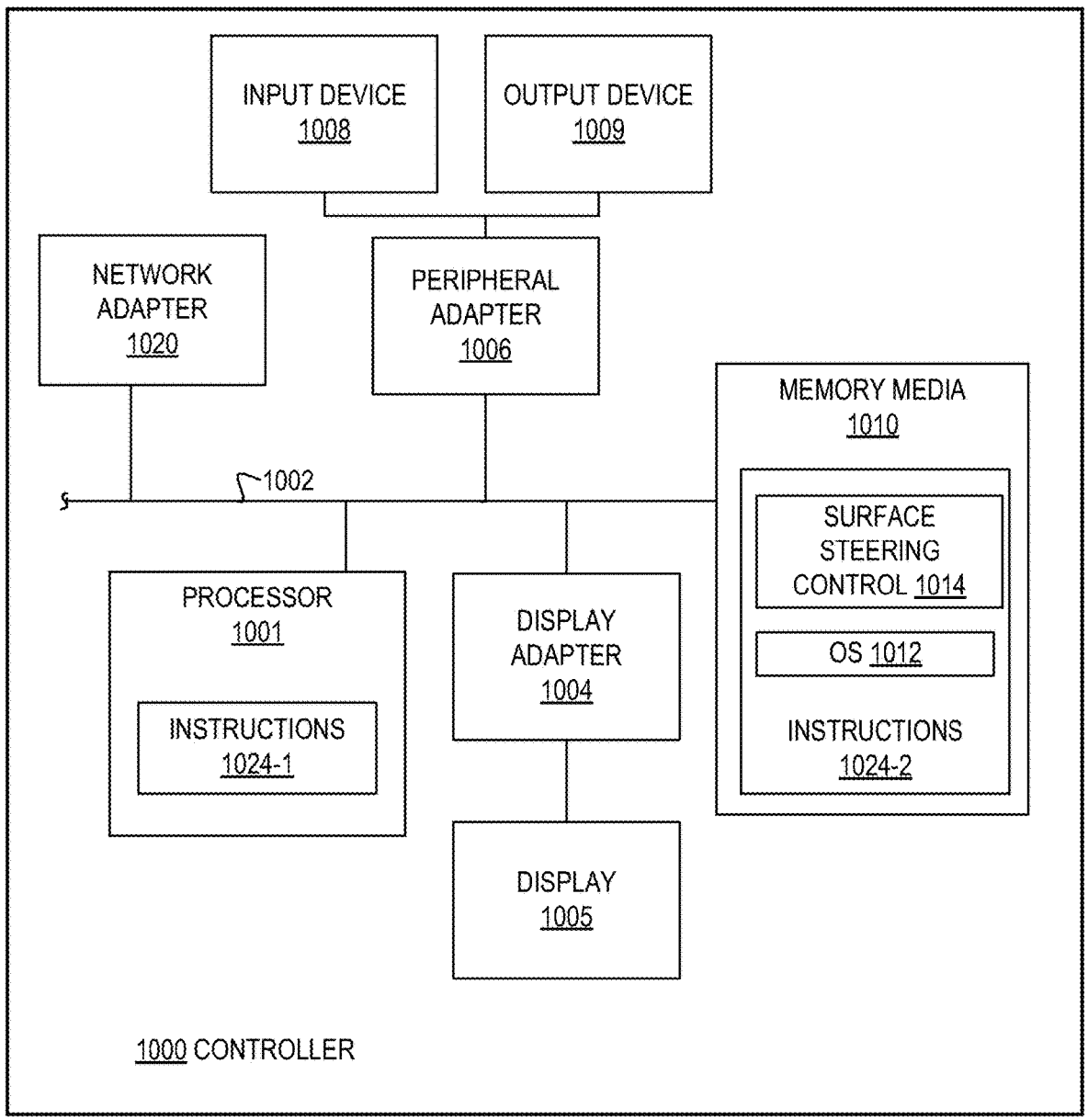
FIG. 10 is a depiction of a controller usable by the rig control systems.

Steering control system 168 represent an instance of a processor having an accessible memory storing instructions executable by the processor, such as an instance of controller 1000 shown in FIG. 10. Also, WOB/differential pressure control system 522, positional/rotary' control system 524, and fluid circulation control system 526 may each represent an instance of a processor having an accessible memory storing instructions executable by the processor, such as an instance of controller 1000 shown in FIG. 10, but for example, in a configuration as a programmable logic controller (PLC) that may not include a user interface but may be used as an embedded controller. Accordingly, it is noted that each of the systems included in rig controls 520 may be a separate controller, such as a PLC, and may autonomously operate, at least to a degree. Steering control system 168 may represent hardware that executes instructions to implement a surface steerable system that provides feedback and automation capability to an operator, such as a driller. For example, steering control system 168 may cause autodriller 510, bit guidance 512 (also referred to as a bit guidance system (BGS)), and autoslide 514 (among others, not shown) to be activated and executed at an appropriate time during drilling. In particular implementations, steering control system 168 may be enabled to provide a user interface during drilling, such as the user interface 850 depicted and described below with respect to FIG. 8. Accordingly, steering control system 168 may interface with rig controls 520 to facilitate manual, assisted manual, semi-automatic, and automatic operation of drilling equipment 530 included in drilling rig 210. It is noted that rig controls 520 may also accordingly be enabled for manual or user-controlled operation of drilling, and may include certain levels of automation with respect to drilling equipment 530.

In rig control systems 500 of FIG. 5, WOB/differential pressure control system 522 may be interfaced with draw works/snubbing unit 532 to control WOB of drill string 146. Positional/rotary control system 524 may be interfaced with top drive 140 to control rotation of drill string 146. Fluid circulation control system 526 may be interfaced with mud pumping 536 to control mud flow and may also receive and decode mud telemetry signals. Sensor system 528 may be interfaced with MWD/wireline 538, which may represent various BHA sensors and instrumentation equipment, among other sensors that may be downhole or at the surface.

In rig control systems 500, autodriller 510 may represent an automated rotary drilling system and may be used for controlling rotary drilling. Accordingly, autodriller 510 may enable automate operation of rig controls 520 during rotary drilling, as indicated in the well plan. Bit guidance 512 may represent an automated control system to monitor and control performance and operation drilling bit 148.

In rig control systems 500, autoslide 514 may represent an automated slide drilling system and may be used for controlling slide drilling. Accordingly, autoslide 514 may enable automate operation of rig controls 520 during a slide, and may return control to steering control system 168 for rotary drilling at an appropriate time, as indicated in the well plan. In particular implementations, autoslide 514 may be enabled to provide a user interface during slide drilling to specifically monitor and control the slide. For example, autoslide 514 may rely on bit guidance 512 for orienting a tool face and on autodriller 510 to set WOB or control rotation or vibration of drill string 146.

Figure 6:
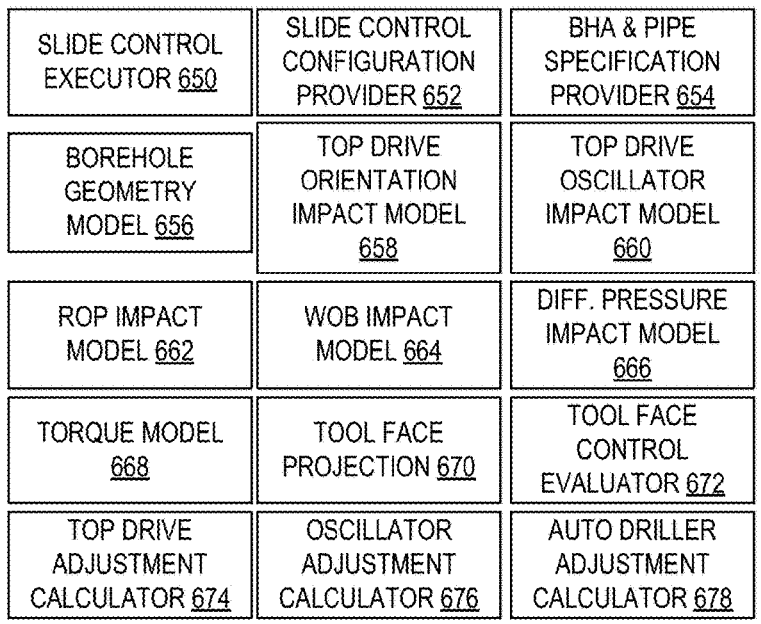
FIG. 6 is a depiction of algorithm modules used by the rig control systems.

FIG. 6 illustrates one embodiment of control algorithm modules 600 used with steering control system 168. The control algorithm modules 600 of FIG. 6 include: a slide control executor 650 that is responsible for managing the execution of the slide control algorithms; a slide control configuration provider 652 that is responsible for validating, maintaining, and providing configuration parameters for the other software modules; a BHA & pipe specification provider 654 that is responsible for managing and providing details of BHA 149 and drill string 146 characteristics; a borehole geometry model 656 that is responsible for keeping track of the borehole geometry and providing a representation to other software modules; a top drive orientation impact model 658 that is responsible for modeling the impact that changes to the angular orientation of top drive 140 have had on the tool face control; a top drive oscillator impact model 660 that is responsible for modeling the impact that oscillations of top drive 140 has had on the tool face control; an ROP impact model 662 that is responsible for modeling the effect on the tool face control of a change in ROP or a corresponding ROP set point; a WOB impact model 664 that is responsible for modeling the effect on the tool face control of a change in WOB or a corresponding WOB set point; a differential pressure impact model 666 that is responsible for modeling the effect on the tool face control of a change in differential pressure (DP) or a corresponding DP set point; a torque model 668 that is responsible for modeling the comprehensive representation of torque for surface, downhole, break over, and reactive torque, modeling impact of those torque values on tool face control, and determining torque operational thresholds; a tool face control evaluator 672 that is responsible for evaluating all factors impacting tool face control and whether adjustments need to be projected, determining whether re-alignment off-bottom is indicated, and determining off-bottom tool face operational threshold windows; a tool face projection 670 that is responsible for projecting tool face behavior for top drive 140, the top drive oscillator, and auto driller adjustments; a top drive adjustment calculator 674 that is responsible for calculating top drive adjustments resultant to tool face projections; an oscillator adjustment calculator 676 that is responsible for calculating oscillator adjustments resultant to tool face projections; and an autodriller adjustment calculator 678 that is responsible for calculating adjustments to autodriller 510 resultant to tool face projections.

Figure 7:
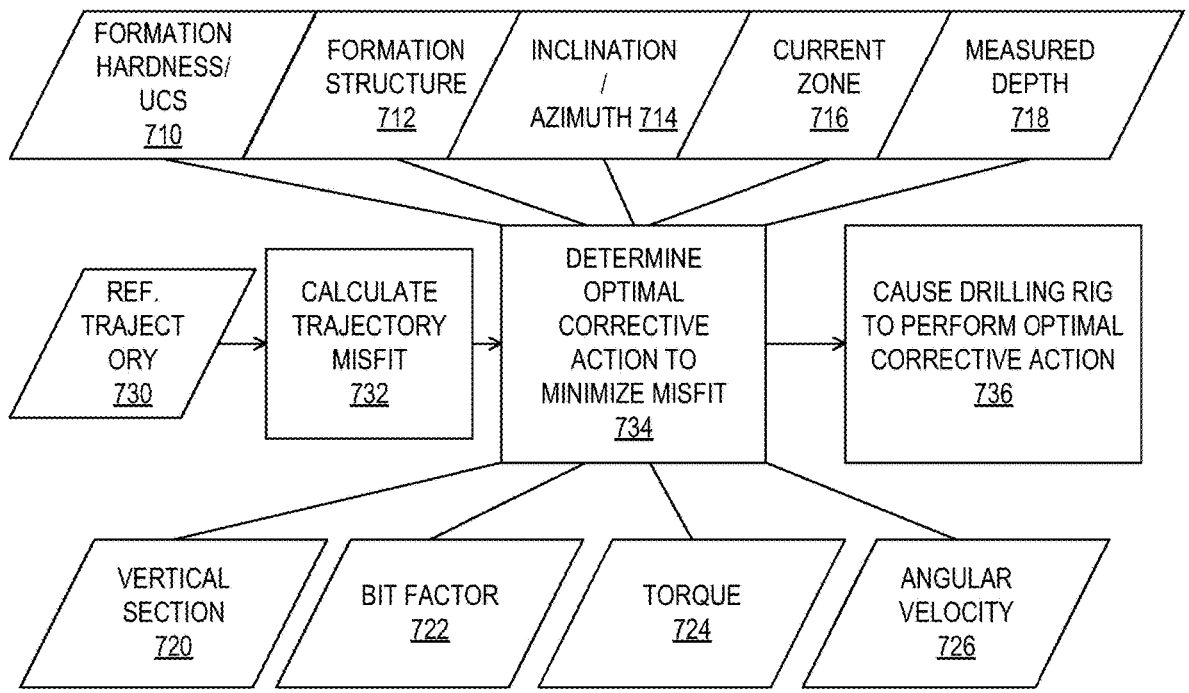
FIG. 7 is a depiction of a steering control process used by the rig control systems.

FIG. 7 illustrates one embodiment of a steering control process 700 for determining a corrective action for drilling. Steering control process 700 may be used for rotary drilling or slide drilling in different embodiments.

Steering control process 700 in FIG. 7 illustrates a variety of inputs that can be used to determine an optimum corrective action. As shown in FIG. 7, the inputs include formation hardness/unconfined compressive strength (UCS) 710, formation structure 712, inclination/azimuth 714, current zone 716, measured depth 718, desired tool face 730, vertical section 720, bit factor 722, mud motor torque 724, reference trajectory 730, vertical section 720, bit factor 722, torque 724 and angular velocity 726. In FIG. 7, reference trajectory 730 of borehole 106 is determined to calculate a trajectory misfit in a step 732. Step 732 may output the trajectory misfit to determine a corrective action to minimize the misfit at step 734, which may be performed using the other inputs described above. Then, at step 736, the drilling rig is caused to perform the corrective action.

It is noted that in some implementations, at least certain portions of steering control process 700 may be automated or performed without user intervention, such as using rig control systems 700 (see FIG. 7). In other implementations, the corrective action in step 736 may be provided or communicated (by display, SMS message, email, or otherwise) to one or more human operators, who may then take appropriate action. The human operators may be members of a rig crew, which may be located at or near drilling rig 210, or may be located remotely from drilling rig 210.

Figure 8:
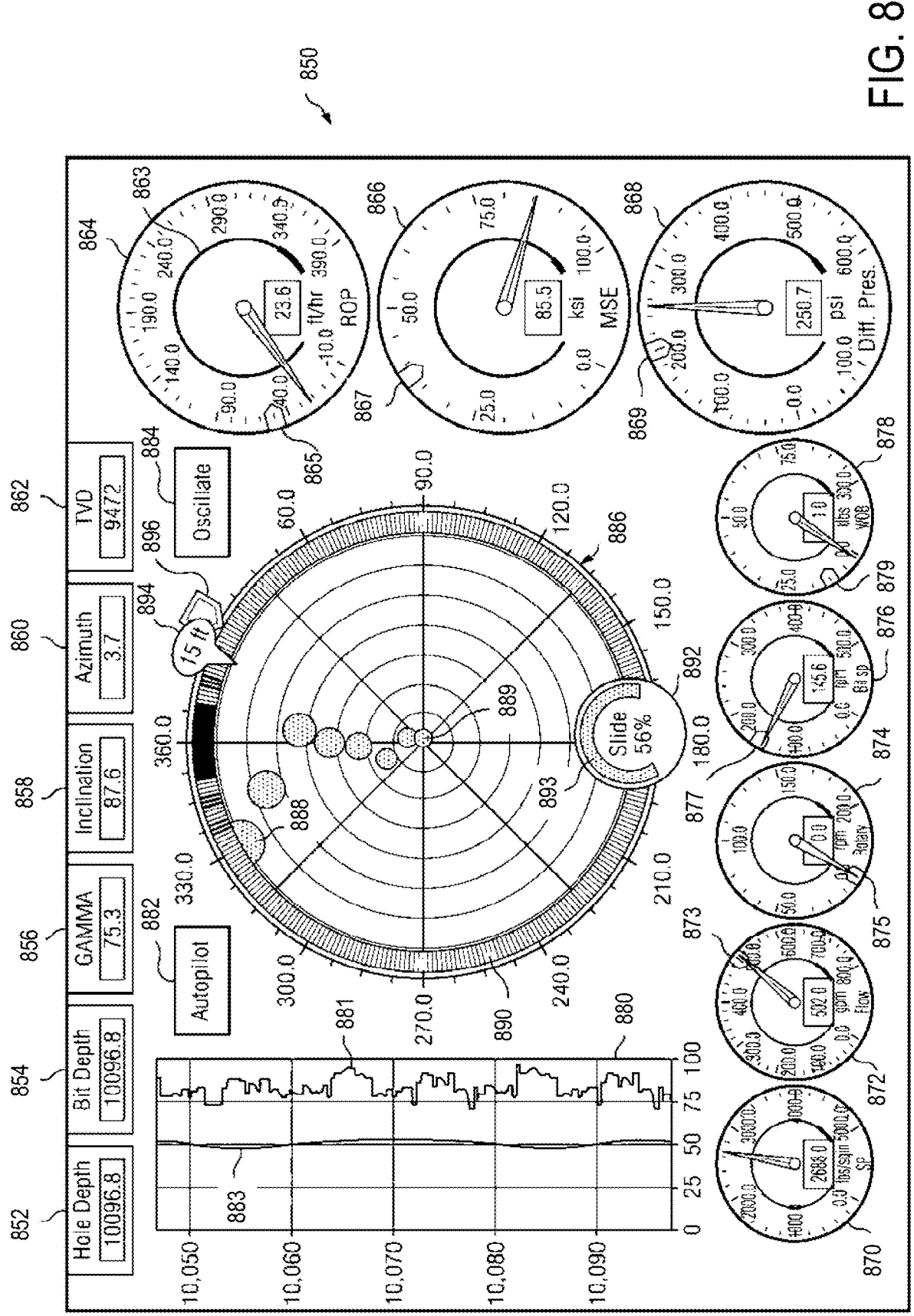
FIG. 8 is a depiction of a graphical user interface provided by the rig control systems.

Referring to FIG. 8, one embodiment of a user interface 850 that may be generated by steering control system 168 for monitoring and operation by a human operator is illustrated. User interface 850 may provide many different types of information in an easily accessible format. For example, user interface 850 may be shown on a computer monitor, a television, a viewing screen (e.g., a display device) associated with steering control system 168.

As shown in FIG. 8, user interface 850 provides visual indicators such as a hole depth indicator 852, a bit depth indicator 854, a GAMMA indicator 856, an inclination indicator 858, an azimuth indicator 860, and a TVD indicator 862. Other indicators may also be provided, including a ROP indicator 864, a mechanical specific energy (MSE) indicator 866, a differential pressure indicator 868, a standpipe pressure indicator 870, a flow rate indicator 872, a rotary RPM (angular velocity) indicator 874, a bit speed indicator 876, and a WOB indicator 878.

In FIG. 8, at least some of indicators 864, 866, 868, 870, 872, 874, 876, and 878 may include a marker representing a target value. For example, markers may be set as certain given values, but it is noted that any desired target value may be used. Although not shown, in some embodiments, multiple markers may be present on a single indicator. The markers may vary in color or size. For example, ROP indicator 864 may include a marker 865 indicating that the target value is 50 feet/hour (or 15 m/h). MSE indicator 866 may include a marker 867 indicating that the target value is 37 ksi (or 255 MPa). Differential pressure indicator 868 may include a marker 869 indicating that the target value is 200 psi (or 1.38 kPa). ROP indicator 864 may include a marker 865 indicating that the target value is 50 feet/hour (or 15 m/h). Standpipe pressure indicator 870 may have no marker in the present example. Flow rate indicator 872 may include a marker 873 indicating that the target value is 500 gpm (or 31.5 L/s) Rotary RPM indicator 874 may include a marker 875 indicating that the target value is 0 RPM (e.g., due to sliding). Bit speed indicator 876 may include a marker 877 indicating that the target value is 150 RPM. WOB indicator 878 may include a marker 879 indicating that the target value is 10 klbs (or 4,500 kg). Each indicator may also include a colored band, or another marking, to indicate, for example, whether the respective gauge value is within a safe range (e.g., indicated by a green color), within a caution range (e.g., indicated by a yellow color), or within a danger range (e.g., indicated by a red color).

In FIG. 8, a log chart 880 may visually indicate depth versus one or more measurements (e.g., may represent log inputs relative to a progressing depth chart). For example, log chart 880 may have a Y-axis representing depth and an X-axis representing a measurement such as GAMMA count 881 (as shown), ROP 883 (e.g., empirical ROP and normalized ROP), or resistivity. An autopilot button 882 and an oscillate button 884 may be used to control activity. For example, autopilot button 882 may be used to engage or disengage autodriller 510, while oscillate button 884 may be used to directly control oscillation of drill string 146 or to engage/disengage an external hardware device or controller.

In FIG. 8, a circular chart 886 may provide current and historical tool face orientation information (e.g., which way the bend is pointed). For purposes of illustration, circular chart 886 represents three hundred and sixty degrees. A series of circles within circular chart 886 may represent a timeline of tool face orientations, with the sizes of the circles indicating the temporal position of each circle. For example, larger circles may be more recent than smaller circles, so a largest circle 888 may be the newest reading and a smallest circle 889 may be the oldest reading. In other embodiments, circles 889, 888 may represent the energy or progress made via size, color, shape, a number within a circle, etc. For example, a size of a particular circle may represent an accumulation of orientation and progress for the period of time represented by the circle. In other embodiments, concentric circles representing time (e.g., with the outside of circular chart 886 being the most recent time and the center point being the oldest time) may be used to indicate the energy or progress (e.g., via color or patterning such as dashes or dots rather than a solid line).

In user interface 850, circular chart 886 may also be color coded, with the color coding existing in a band 890 around circular chart 886 or positioned or represented in other ways. The color coding may use colors to indicate activity in a certain direction. For example, the color red may indicate the highest level of activity, while the color blue may indicate the lowest level of activity. Furthermore, the arc range in degrees of a color may indicate the amount of deviation. Accordingly, a relatively narrow (e.g., thirty degrees) arc of red with a relatively broad (e.g., three hundred degrees) arc of blue may indicate that most activity is occurring in a particular tool face orientation with little deviation. As shown in user interface 850, the color blue may extend from approximately 22-337 degrees, the color green may extend from approximately 15-22 degrees and 337-345 degrees, the color yellow may extend a few degrees around the 13 and 345 degree marks, while the color red may extend from approximately 347-10 degrees. Transition colors or shades may be used with, for example, the color orange marking the transition between red and yellow or a light blue marking the transition between blue and green. This color coding may enable user interface 850 to provide an intuitive summary of how narrow the standard deviation is and how much of the energy intensity is being expended in the proper direction. Furthermore, the center of energy may be viewed relative to the target. For example, user interface 850 may clearly show that the target is at 90 degrees but the center of energy is at 45 degrees.

In user interface 850, other indicators, such as a slide indicator 892, may indicate how much time remains until a slide occurs or how much time remains for a current slide. For example, slide indicator 892 may represent a time, a percentage (e.g., as shown, a current slide may be 56% complete), a distance completed, or a distance remaining. Slide indicator 892 may graphically display information using, for example, a colored bar 893 that increases or decreases with slide progress. In some embodiments, slide indicator 892 may be built into circular chart 886 (e.g., around the outer edge with an increasing/decreasing band), while in other embodiments slide indicator 892 may be a separate indicator such as a meter, a bar, a gauge, or another indicator type. In various implementations, slide indicator 892 may be refreshed by autoslide 514.

In user interface 850, an error indicator 894 may indicate a magnitude and a direction of error. For example, error indicator 894 may indicate that an estimated drill bit position is a certain distance from the planned trajectory, with a location of error indicator 894 around the circular chart 886 representing the heading. For example, FIG. 8 illustrates an error magnitude of 15 feet and an error direction of 15 degrees. Error indicator 894 may be any color but may be red for purposes of example. It is noted that error indicator 894 may present a zero if there is no error. Error indicator may represent that drill bit 148 is on the planned trajectory using other means, such as being a green color. Transition colors, such as yellow, may be used to indicate varying amounts of error. In some embodiments, error indicator 894 may not appear unless there is an error in magnitude or direction. A marker 896 may indicate an ideal slide direction. Although not shown, other indicators may be present, such as a bit life indicator to indicate an estimated lifetime for the current bit based on a value such as time or distance.

It is noted that user interface 850 may be arranged in many different ways. For example, colors may be used to indicate normal operation, warnings, and problems. In such cases, the numerical indicators may display numbers in one color (e.g., green) for normal operation, may use another color (e.g., yellow) for warnings, and may use yet another color (e.g., red) when a serious problem occurs. The indicators may also flash or otherwise indicate an alert. The gauge indicators may include colors (e.g., green, yellow, and red) to indicate operational conditions and may also indicate the target value (e.g., an ROP of 100 feet/hour). For example, ROP indicator 868 may have a green bar to indicate a normal level of operation (e.g., from 10-300 feet/hour), a yellow bar to indicate a warning level of operation (e.g., from 300-360 feet/hour), and a red bar to indicate a dangerous or otherwise out of parameter level of operation (e.g., from 360-390 feet/hour). ROP indicator 868 may also display a marker at 100 feet/hour to indicate the desired target ROP.

Furthermore, the use of numeric indicators, gauges, and similar visual display indicators may be varied based on factors such as the information to be conveyed and the personal preference of the viewer. Accordingly, user interface 850 may provide a customizable view of various drilling processes and information for a particular individual involved in the drilling process. For example, steering control system 168 may enable a user to customize the user interface 850 as desired, although certain features (e.g., standpipe pressure) may be locked to prevent a user from intentionally or accidentally removing important drilling information from user interface 850. Other features and attributes of user interface 850 may be set by user preference. Accordingly, the level of customization and the information shown by the user interface 850 may be controlled based on who is viewing user interface 850 and their role in the drilling process.

Figure 9:
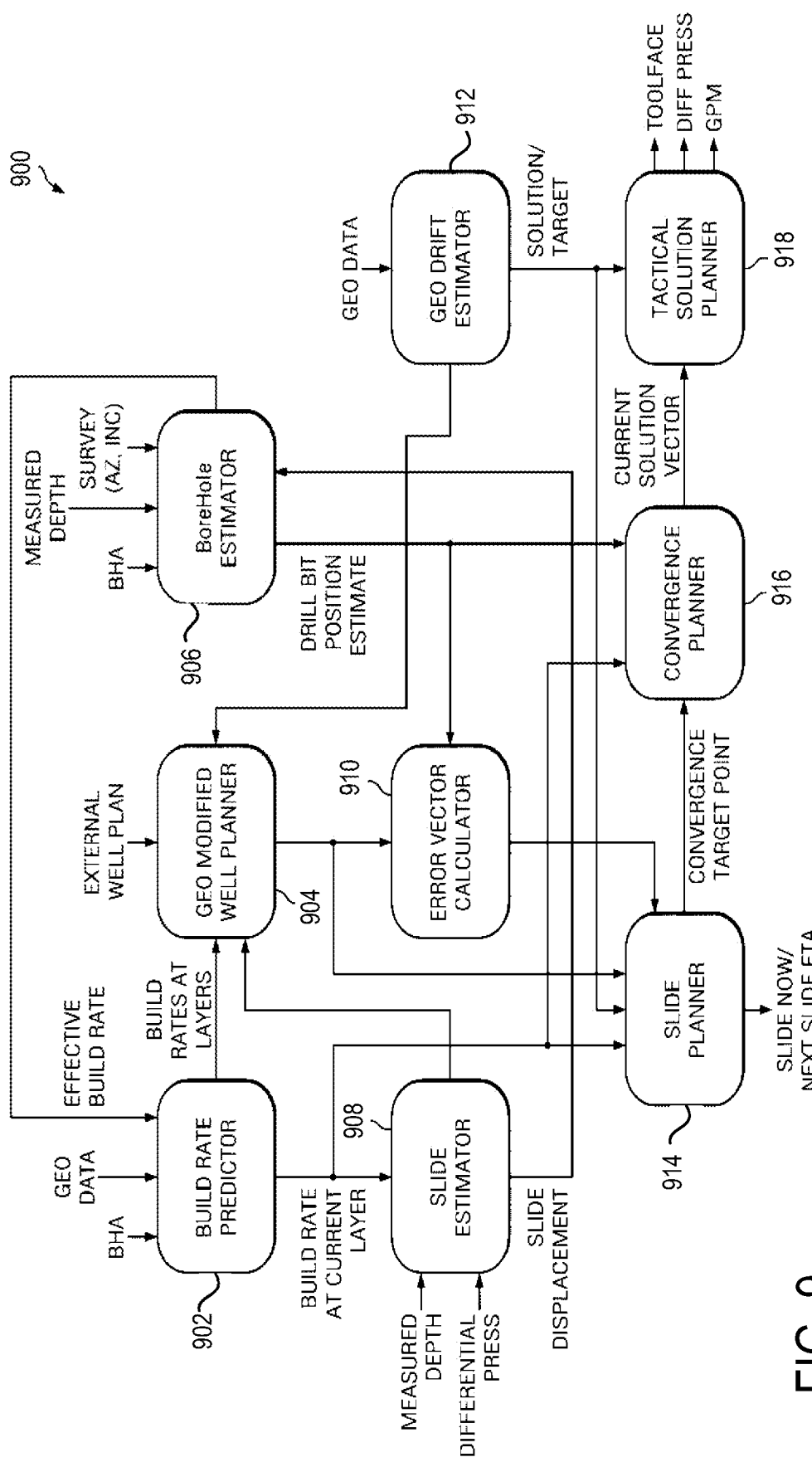
FIG. 9 is a depiction of a guidance control loop performed by the rig control systems.

Referring to FIG. 9, one embodiment of a guidance control loop (GCL) 900 is shown in further detail GCL 900 may represent one example of a control loop or control algorithm executed under the control of steering control system 168. GCL 900 may include various functional modules, including a build rate predictor 902, a geo modified well planner 904, a borehole estimator 906, a slide estimator 908, an error vector calculator 910, a geological drift estimator 912, a slide planner 914, a convergence planner 916, and a tactical solution planner 918. In the following description of GCL 900, the term "external input" refers to input received from outside GCL 900, while "internal input" refers to input exchanged between functional modules of GCL 900.

In FIG. 9, build rate predictor 902 receives external input representing BHA information and geological information, receives internal input from the borehole estimator 906, and provides output to geo modified well planner 904, slide estimator 908, slide planner 914, and convergence planner 916. Build rate predictor 902 is configured to use the BHA information and geological information to predict drilling build rates of current and future sections of borehole 106. For example, build rate predictor 902 may determine how aggressively a curve will be built for a given formation with BHA 149 and other equipment parameters.

In FIG. 9, build rate predictor 902 may use the orientation of BHA 149 to the formation to determine an angle of attack for formation transitions and build rates within a single layer of a formation. For example, if a strata layer of rock is below a strata layer of sand, a formation transition exists between the strata layer of sand and the strata layer of rock. Approaching the strata layer of rock at a 90 degree angle may provide a good tool face and a. clean drill entry, while approaching the rock layer at a 45 degree angle may build a curve relatively quickly. An angle of approach that is near parallel may cause drill bit 148 to skip off the upper surface of the strata layer of rock. Accordingly, build rate predictor 902 may calculate BHA orientation to account for formation transitions. Within a single strata layer, build rate predictor 902 may use the BHA orientation to account for internal layer characteristics (e.g., grain) to determine build rates for different parts of a strata layer. The BHA information may include bit characteristics, mud motor bend setting, stabilization and mud motor bit to bend distance. The geological information may include formation data such as compressive strength, thicknesses, and depths for formations encountered in the specific drilling location. Such information may enable a calculation-based prediction of the build rates and ROP that may be compared to both results obtained while drilling borehole 106 and regional historical results (e.g., from the regional drilling DB 412) to improve the accuracy of predictions as drilling progresses. Build rate predictor 902 may also be used to plan convergence adjustments and confirm in advance of drilling that targets can be achieved with current parameters.

In FIG. 9, geo modified well planner 904 receives external input representing a well plan, internal input from build rate predictor 902 and geo drift estimator 912, and provides output to slide planner 914 and error vector calculator 910. Geo modified well planner 904 uses the input to determine whether there is a more desirable trajectory than that provided by the well plan, while staying within specified error limits. More specifically, geo modified well planner 904 takes geological information (e.g., drift) and calculates whether another trajectory solution to the target may be more efficient in terms of cost or reliability. The outputs of geo modified well planner 904 to slide planner 914 and error vector calculator 910 may be used to calculate an error vector based on the current vector to the newly calculated trajectory and to modify slide predictions. In some embodiments, geo modified well planner 904 (or another module) may provide functionality needed to track a formation trend. For example, in horizontal wells, a geologist may provide steering control system 168 with a target inclination angle as a set point for steering control system 168 to control. For example, the geologist may enter a target to steering control system 168 of 90.5-91.0 degrees of inclination angle for a section of borehole 106. Geo modified well planner 904 may then treat the target as a vector target, while remaining within the error limits of the original well plan. In some embodiments, geo modified well planner 904 may be an optional module that is not used unless the well plan is to be modified. For example, if the well plan is marked in steering control system 168 as non-modifiable, geo modified well planner 904 may be bypassed altogether or geo modified well planner 904 may be configured to pass the well plan through without any changes.

In FIG. 9, borehole estimator 906 may receive external inputs representing BHA information, measured depth information, survey information (e.g., azimuth angle and inclination angle), and may provide outputs to build rate predictor 902, error vector calculator 910, and convergence planner 916. Borehole estimator 906 may be configured to provide an estimate of the actual borehole and drill bit position and trajectory angle without delay, based on either straight line projections or projections that incorporate sliding. Borehole estimator 906 may be used to compensate for a sensor being physically located some distance behind drill bit 148 (e.g., 50 feet) in drill string 146, which makes sensor readings lag the actual bit location by 50 feet. Borehole estimator 906 may also be used to compensate for sensor measurements that may not be continuous (e.g., a sensor measurement may occur every 100 feet). Borehole estimator 906 may provide the most accurate estimate from the surface to the last survey location based on the collection of survey measurements. Also, borehole estimator 906 may take the slide estimate from slide estimator 908 (described below) and extend the slide estimate from the last survey point to a current location of drill bit 148. Using the combination of these two estimates, borehole estimator 906 may provide steering control system 168 with an estimate of the drill bit's location and trajectory angle from which guidance and steering solutions can be derived. An additional metric that can be derived from the borehole estimate is the effective build rate that is achieved throughout the drilling process.

In FIG. 9, slide estimator 908 receives external inputs representing measured depth and differential pressure information, receives internal input from build rate predictor 902, and provides output to borehole estimator 906 and geo modified well planner 904. Slide estimator 908 may be configured to sample tool face orientation, differential pressure, measured depth (MD) incremental movement, MSE, and other sensor feedback to quantify/estimate a deviation vector and progress while sliding.

Traditionally, deviation from the slide would be predicted by a human operator based on experience. The operator would, for example, use a long slide cycle to assess what likely was accomplished during the last slide. However, the results are generally not confirmed until the downhole survey sensor point passes the slide portion of the borehole, often resulting in a response lag defined by a distance of the sensor point from the drill bit tip (e.g., approximately 50 feet). Such a response lag may introduce inefficiencies in the slide cycles due to over/under correction of the actual trajectory relative to the planned trajectory.

In GCL 900, using slide estimator 908, each tool face update may be algorithmically merged with the average differential pressure of the period between the previous and current tool face readings, as well as the MD change during this period to predict the direction, angular deviation, and MD progress during the period. As an example, the periodic rate may be between 10 and 60 seconds per cycle depending on the tool face update rate of downhole tool 166. With a more accurate estimation of the slide effectiveness, the sliding efficiency can be improved. The output of slide estimator 908 may accordingly be periodically provided to borehole estimator 906 for accumulation of well deviation information, as well to geo modified well planner 904. Some or all of the output of the slide estimator 908 may be output to an operator, such as shown in the user interface 850 of FIG. 8.

In FIG. 9, error vector calculator 910 may receive internal input from geo modified well planner 904 and borehole estimator 906. Error vector calculator 910 may be configured to compare the planned well trajectory to an actual borehole trajectory and drill bit position estimate. Error vector calculator 910 may provide the metrics used to determine the error (e.g., how far off) the current drill bit position and trajectory are from the well plan. For example, error vector calculator 910 may calculate the error between the current bit position and trajectory to the planned trajectory and the desired bit position. Error vector calculator 910 may also calculate a projected bit position/projected trajectory representing the future result of a current error.

In FIG. 9, geological drift estimator 912 receives external input representing geological information and provides outputs to geo modified well planner 904, slide planner 914, and tactical solution planner 918. During drilling, drift may occur as the particular characteristics of the formation affect the drilling direction. More specifically, there may be a trajectory bias that is contributed by the formation as a function of ROP and BHA 149. Geological drift estimator 912 is configured to provide a drift estimate as a vector that can then be used to calculate drift compensation parameters that can be used to offset the drift in a control solution.

In FIG. 9, slide planner 914 receives internal input from build rate predictor 902, geo modified well planner 904, error vector calculator 910, and geological drift estimator 912, and provides output to convergence planner 916 as well as an estimated time to the next slide. Slide planner 914 may be configured to evaluate a slide/drill ahead cost calculation and plan for sliding activity, which may include factoring in BHA wear, expected build rates of current and expected formations, and the well plan trajectory. During drill ahead, slide planner 914 may attempt to forecast an estimated time of the next slide to aid with planning. For example, if additional lubricants (e.g., fluorinated beads) are indicated for the next slide, and pumping the lubricants into drill string 146 has a lead time of 30 minutes before the slide, the estimated time of the next slide may be calculated and then used to schedule when to start pumping the lubricants. Functionality for a loss circulation material (LCM) planner may be provided as part of slide planner 914 or elsewhere (e.g., as a stand-alone module or as part of another module described herein). The LCM planner functionality may be configured to determine whether additives should be pumped into the borehole based on indications such as flow-in versus flow-back measurements. For example, if drilling through a porous rock formation, fluid being pumped into the borehole may get lost in the rock formation. To address this issue, the LCM planner may control pumping LCM into the borehole to clog up the holes in the porous rock surrounding the borehole to establish a more closed-loop control system for the fluid.

In FIG. 9, slide planner 914 may also look at the current position relative to the next connection. A connection may happen every 90 to 100 feet (or some other distance or distance range based on the particulars of the drilling operation) and slide planner 914 may avoid planning a slide when close to a connection or when the slide would carry through the connection. For example, if the slide planner 914 is planning a 50 foot slide but only 20 feet remain until the next connection, slide planner 914 may calculate the slide starting after the next connection and make any changes to the slide parameters to accommodate waiting to slide until after the next connection. Such flexible implementation avoids inefficiencies that may be caused by starting the slide, stopping for the connection, and then having to reorient the tool face before finishing the slide. During slides, slide planner 914 may provide some feedback as to the progress of achieving the desired goal of the current slide. In some embodiments, slide planner 914 may account for reactive torque in drill string 146. More specifically, when rotating is occurring, there is a reactional torque wind up in drill string 146. When the rotating is stopped, drill string 146 unwinds, which changes tool face orientation and other parameters. When rotating is started again, drill string 146 starts to wind back up. Slide planner 914 may account for the reactional torque so that tool face references are maintained, rather than stopping rotation and then trying to adjust to a desired tool face orientation. While not all downhole tools may provide tool face orientation when rotating, using one that does supply such information for GCL 900 may significantly reduce the transition time from rotating to sliding.

In FIG. 9, convergence planner 916 receives internal inputs from build rate predictor 902, borehole estimator 906, and slide planner 914, and provides output to tactical solution planner 918. Convergence planner 916 is configured to provide a convergence plan when the current drill bit position is not within a defined margin of error of the planned well trajectory. The convergence plan represents a path from the current drill bit position to an achievable and desired convergence target point along the planned trajectory. The convergence plan may take account the amount of sliding/drilling ahead that has been planned to take place by slide planner 914. Convergence planner 916 may also use BHA orientation information for angle of attack calculations when determining convergence plans as described above with respect to build rate predictor 902. The solution provided by convergence planner 916 defines a new trajectory solution for the current position of drill bit 148. The solution may be immediate without delay, or planned for implementation at a future time that is specified in advance.

In FIG. 9, tactical solution planner 918 receives internal inputs from geological drift estimator 912 and convergence planner 916, and provides external outputs representing information such as tool face orientation, differential pressure, and mud flow rate. Tactical solution planner 918 is configured to take the trajectory solution provided by convergence planner 916 and translate the solution into control parameters that can be used to control drilling rig 210. For example, tactical solution planner 918 may convert the solution into settings for control systems 522, 524, and 526 to accomplish the actual drilling based on the solution. Tactical solution planner 918 may also perform performance optimization to optimizing the overall drilling operation as well as optimizing the drilling itself (e.g., how to drill faster).

Other functionality may be provided by GCL 900 in additional modules or added to an existing module. For example, there is a relationship between the rotational position of the drill pipe on the surface and the orientation of the downhole tool face. Accordingly, GCL 900 may receive information corresponding to the rotational position of the drill pipe on the surface. GCL 900 may use this surface positional information to calculate current and desired tool face orientations. These calculations may then be used to define control parameters for adjusting the top drive 140 to accomplish adjustments to the downhole tool face in order to steer the trajectory of borehole 106.

For purposes of example, an object-oriented software approach may be utilized to provide a class-based structure that may be used with GCL 900 or other functionality provided by steering control system 168. In GCL 900, a drilling model class may be defined to capture and define the drilling state throughout the drilling process. The drilling model class may include information obtained without delay. The drilling model class may be based on the following components and sub-models: a drill bit model, a borehole model, a rig surface gear model, a mud pump model, a WOB/differential pressure model, a positional/rotary model, an MSE model, an active well plan, and control limits. The drilling model class may produce a control output solution and may be executed via a main processing loop that rotates through the various modules of GCL 900. The drill bit model may represent the current position and state of drill bit 148. The drill bit model may include a three dimensional (3D) position, a drill bit trajectory, BHA information, bit speed, and tool face (e.g., orientation information). The 3D position may be specified in north-south (NS), east-west (EW), and true vertical depth (TVD). The drill bit trajectory may be specified as an inclination angle and an azimuth angle. The BHA information may be a set of dimensions defining the active BHA. The borehole model may represent the current path and size of the active borehole. The borehole model may include hole depth information, an array of survey points collected along the borehole path, a gamma log, and borehole diameters. The hole depth information is for current drilling of borehole 106. The borehole diameters may represent the diameters of borehole 106 as drilled over current drilling. The rig surface gear model may represent pipe length, block height, and other models, such as the mud pump model, WOB/differential pressure model, positional/rotary model, and MSE model. The mud pump model represents mud pump equipment and includes flow rate, standpipe pressure, and differential pressure. The WOB/differential pressure model represents draw works or other WOB/differential pressure controls and parameters, including WOB. The positional/rotary model represents top drive or other positional/rotary controls and parameters including rotary RPM and spindle position. The active well plan represents the target borehole path and may include an external well plan and a modified well plan. The control limits represent defined parameters that may be set as maximums and/or minimums. For example, control limits may be set for the rotary RPM in the top drive model to limit the maximum RPMs to the defined level. The control output solution may represent the control parameters for drilling rig 210.

Each functional module of GCL 900 may have behavior encapsulated within a respective class definition. During a processing window, the individual functional modules may have an exclusive portion in time to execute and update the drilling model. For purposes of example, the processing order for the functional modules may be in the sequence of geo modified well planner 904, build rate predictor 902, slide estimator 908, borehole estimator 906, error vector calculator 910, slide planner 914, convergence planner 916, geological drift estimator 912, and tactical solution planner 918. It is noted that other sequences may be used in different implementations.

In FIG. 9, GCL 900 may rely on a programmable timer module that provides a timing mechanism to provide timer event signals to drive the main processing loop. While steering control system 168 may rely on timer and date calls driven by the programming environment, timing may be obtained from other sources than system time. In situations where it may be advantageous to manipulate the clock (e.g., for evaluation and testing), a programmable timer module may be used to alter the system time. For example, the programmable timer module may enable a default time set to the system time and a time scale of 1.0, may enable the system time of steering control system 168 to be manually set, may enable the time scale relative to the system time to be modified, or may enable periodic event time requests scaled to a requested time scale.

Referring now to FIG. 10, a block diagram illustrating selected elements of an embodiment of a controller 1000 for performing surface steeling according to the present disclosure. In various embodiments, controller 1000 may represent an implementation of steering control system 168. In other embodiments, at least certain portions of controller 1000 may be used for control systems 510, 512, 514, 522, 524, and 526 (see FIG. 5).

In the embodiment depicted in FIG. 10, controller 1000 includes processor 1001 coupled via shared bus 1002 to storage media collectively identified as memory media 1010.

Controller 1000, as depicted in FIG. 10, further includes network adapter 1020 that interfaces controller 1000 to a network (not shown in FIG. 10). In embodiments suitable for use with user interfaces, controller 1000, as depicted in FIG. 10, may include peripheral adapter 1006, which provides connectivity for the use of input device 1008 and output device 1009. Input device 1008 may represent a device for user input, such as a keyboard or a mouse, or even a video camera. Output device 1009 may represent a device for providing signals or indications to a user, such as loudspeakers for generating audio signals.

Controller 1000 is shown in FIG. 10 including display adapter 1004 and further includes a display device 1005. Display adapter 1004 may interface shared bus 1002, or another bus, with an output port for one or more display devices, such as display device 1005. Display device 1005 may be implemented as a liquid crystal display screen, a computer monitor, a television or the like. Display device 1005 may comply with a display standard for the corresponding type of display. Standards for computer monitors include analog standards such as video graphics array (VGA), extended graphics array (XGA), etc., or digital standards such as digital visual interface (DVI), definition multimedia interface (HDMI), among others. A television display may comply with standards such as NTSC (National Television System Committee), PAL (Phase Alternating Line), or another suitable standard. Display device 1005 may include an output device 1009, such as one or more integrated speakers to play audio content, or may include an input device 1008, such as a microphone or video camera.

In FIG. 10, memory media 1010 encompasses persistent and volatile media, fixed and removable media, and magnetic and semiconductor media. Memory media 1010 is operable to store instructions, data, or both. Memory media 1010 as shown includes sets or sequences of instructions 1024-2, namely, an operating system 1012 and surface steering control 1014. Operating system 1012 may be a UNIX or UNIX-like operating system, a Windows® family operating system, or another suitable operating system. Instructions 1024 may also reside, completely or at least partially, within processor 1001 during execution thereof. It is further noted that processor 1001 may be configured to receive instructions 1024-1 from instructions 1024-2 via shared bus 1002. In some embodiments, memory media 1010 is configured to store and provide executable instructions for executing GCL 900, as mentioned previously, among other methods and operations disclosed herein.

In some embodiments, a system in accordance with the present disclosure includes one or more cameras positioned in a manner to observe the location and/or operation of oil drilling equipment and/or personnel. In some embodiments, cameras in accordance with the present disclosure can include grayscale, color, RGB, or other visible light cameras. Some or all of the cameras used may be digital or analog or a combination. In some embodiments, it may be useful to retrofit a drilling rig with one or more analog cameras with a computer vision drilling system as described herein. In embodiments using analog cameras, the analog video signal can be converted into a digital format prior to use by embodiments of the system using a digital system such as a computer system described herein. In some embodiments, one or more cameras in accordance with the present disclosure can include cameras capable of observing light outside the visible spectrum, such as infrared, near-infrared, or ultraviolet cameras. In some embodiments, one or more cameras in accordance with the present disclosure can include cameras that are capable of recording distance or ranging information, such as time-of-flight cameras or LIDAR sensors. Such one or more time-of-flight or LIDAR sensors or cameras can be used to provide accurate distance, size, shape, dimensions, and other important physical information about a person or thing. in some embodiments, the cameras can comprise arrays of cameras, wide-angle, 360 degree cameras, or other such image capturing devices. The one or more cameras may be video cameras, or may be cameras taking still images, or a combination thereof. In some embodiments, by including many cameras, aspects of the present disclosure can be resilient against individual camera failures by switching to use as input another camera that has not failed. In some embodiments, interpretative processing can be used to fill gaps in image data caused by transmission dropout, blind spots, or other occlusions to monitor aspects of the drilling rig that are temporarily or permanently not visible to the camera system. The computer vision system may include one or more cameras coupled to one or more computer systems, which in turn may be coupled to memory having computer program instructions stored therein, a database, and the computer systems may also be couple to one or more drilling rig systems or control systems for the drilling rig equipment and systems.

In some embodiments, one or more cameras may be connected to a computer system, such as a processing system 1100, that may be located on or near the drilling rig, at a remote location (e.g., cloud-based), or combinations thereof for processing the data obtained by the one or more cameras in accordance with the present disclosure. For example, in some embodiments, a computer system on the drilling rig (or incorporated into the camera), can perform a filtering function, sending only high-interest frames (that is, frames containing useful information) on to a central computing system on the rig or at a remote location for detailed analysis. In some embodiments, this can include dropping frames that are substantially similar to previous frames, applying an object detection model, or performing other analysis with low false negative rates (even if there are high false positives). Advantages of such an architecture include reducing network bandwidth to transmit image data and reducing processing load on centralized processing systems.

Figure 11:
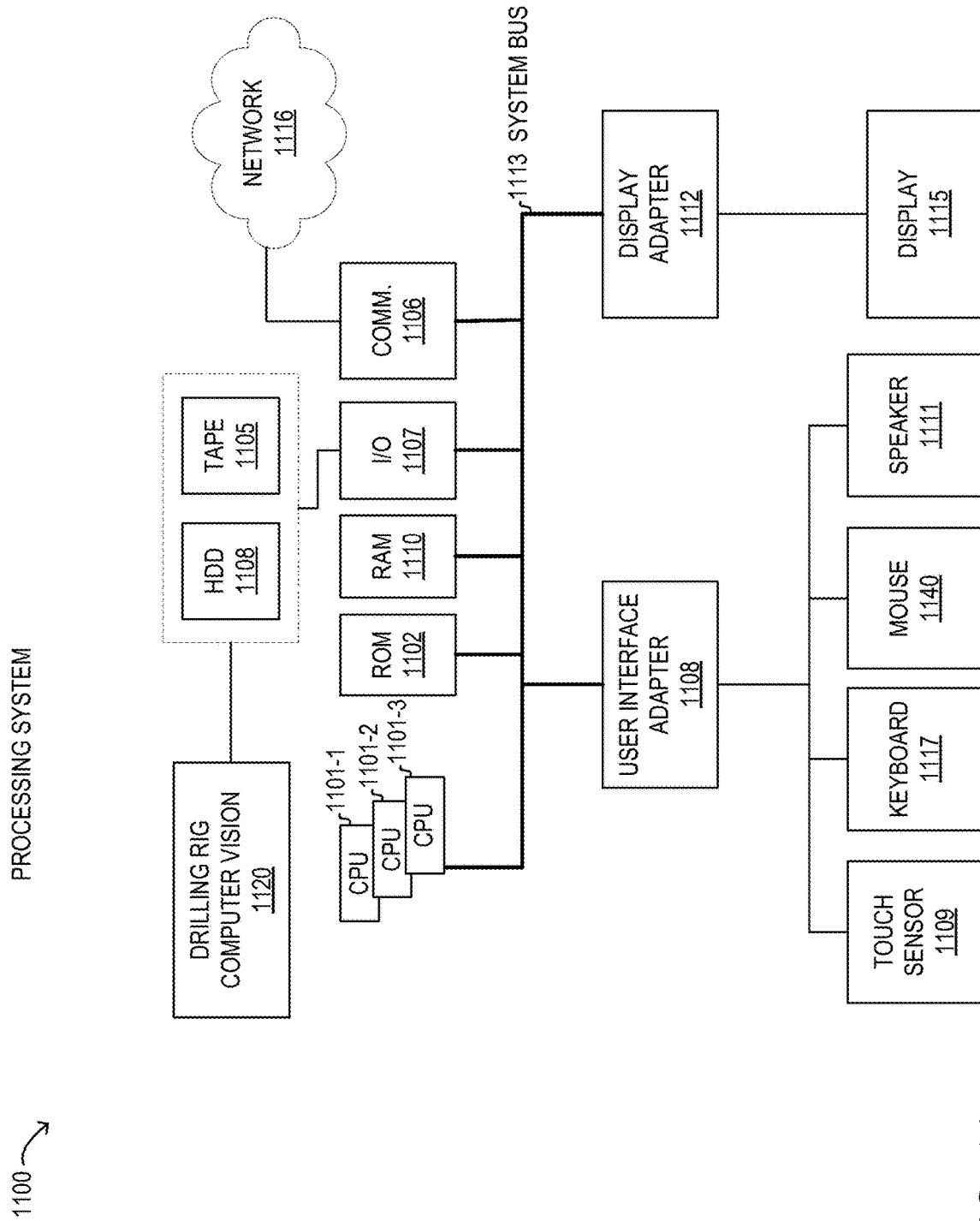
FIG. 11 depicts a computer system in accordance with an embodiment.

Referring now to FIG. 11, there is shown an embodiment of processing system 1100 for implementing systems and methods for oilfield operations using computer vision, as disclosed herein. In FIG. 11, processing system 1100 has one or more central processing units (processors) 1101-1, 1101-2, 1101-2, among others and collectively or generically referred to as processor(s) 1101. Such processors can also comprise arrays of relatively simple processing devices, graphics processing units (GPU's), or other specialized hardware that provides benefits to processing image data. Processors 1101, also referred to as processing circuits, are coupled to system memory 1114 and various other components via a system bus 1113. Read only memory (ROM) 1102 is coupled to system bus 1113 and may include a basic input/output system (BIOS, not shown), which may control certain basic functions of processing system 1100. system memory 1114 can include a ROM 1102 and a random access memory (RAM) 1110, which may be read-write memory accessible via system bus 1113 by processors 1101.

FIG. 11 further depicts an input/output (I/O) adapter 1107 and a network adapter 1106 coupled to the system bus 1113 in processing system 1100. I/O adapter 1107 may be a small computer system interface (SCSI) adapter that communicates with a hard disk (magnetic, solid state, or other kind of hard disk) 1103 and/or tape storage drive 1105 or any other similar component. I/O adapter 1107, hard disk 1103, and tape storage drive 1105 are collectively referred to herein as mass storage 1104. Drilling rig computer vision system 1120 may represent executable code in the form of instructions for execution by processing system 1100 and may be stored in mass storage 1104, and may include specific applications for computer vision. Mass storage 1104 is an example of a tangible storage medium readable by \ processors 1101, where drilling rig computer vision 1120 is stored as instructions for execution by the processors 101 to perform various methods for oilfield operations using computer vision, such as described in further detail below. Network adapter 1106 interconnects system bus 1113 with an outside network 1116 enabling processing system 1100 to communicate with computer systems and networks (not shown). A display 1115 is connected to system bus 1113 by display adapter 1112, which may include a graphics controller to improve the performance of graphics intensive applications and a video controller. In one embodiment, I/O adapters 107, communications adapter 106, and display adapter 1112 may be connected to one or more I/O buses that are connected to system bus 1113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 1113 via user interface adapter 1108 and display adapter 1112. A keyboard 1109, mouse 1140, and speaker 1111 can be interconnected to system bus 1113 via user interface adapter 1108, which may include, for example, a super I/O chip integrating multiple device adapters into a single integrated circuit.

Thus, as configured in FIG. 11, processing system 1100 includes processing capability in the form of processors 1101, and, storage capability including system memory 1114 and mass storage 1104, input means such as a keyboard 1117, mouse 1140, or touch sensor 1109 (including touch sensors 1109 incorporated into displays 1115), and output capability including speaker 1111 and display 1115. In one embodiment, a portion of system memory 1114 and mass storage 1104 collectively store an operating system (not shown) to coordinate the functions of the various components shown in FIG. 1.

In some embodiments, one or more cameras can be used to observe the drilling rig floor. In some embodiments, one or more cameras can observe the positioning and/or operation of equipment or personnel. In some embodiments, one or more cameras can be oriented to observe the drill bit, bottom hole assembly, pipes, tools, and other equipment connected to the drill string and placed down a borehole. In some embodiments, these cameras can identify the type of equipment affixed to the drill string, such as a bottom hole assembly, its stabilizers, measuring-while-drilling (MWD), mud motors, and other types of equipment. In some embodiments, the computer vision drilling system may also include one or more cameras that can be oriented to monitor the drill site or portions of the drill site, as well as other drilling equipment, such as mud tanks, mud pumps, shakers, maintenance equipment, and the like.

In some embodiments, the system can identify each piece of equipment attached to the drill string and record the identity of the equipment and/or order that each was connected to the drill string in memory. For example, aspects of the present disclosure can be used to perform a "pipe tally" function by identifying tubular equipment (pipes, BHA, etc.) attached to the drill string prior to insertion into the borehole. The one or more cameras can be oriented to capture images of the equipment while hanging from the drawworks. Once the images are captured, object detection, edge detection, and other techniques can be used to isolate the portion of the image containing the equipment. In some embodiments, the captured images of the equipment can be compared to a database of images of tubular equipment to identify images that match the captured images. In addition, the features and their dimensions of equipment like the drill bit and/or the BHA may be automatically determined and stored, then used later during drilling to predict drilling performance by the hit and/or BHA, such as based on drilling parameters during drilling operations. In addition, it may be possible to include one or more cameras downhole, such as in the BHA, and to transmit such downhole images to the surface while drilling.

In some embodiments, artificial neural networks (ANN) models can be used to identify the tubular equipment, where the ANN is trained using the database of images of tubular equipment to correctly identify the equipment from the picture. Examples of ANN architectures to perform this feature can include convolutional neural networks, residual networks, and other similar architectures. The equipment detection ANN can be applied to a portion of the captured image containing the tubular equipment, or to the image as a whole.

In some embodiments, measurements can be taken of the tubular equipment by the computer vision system. This feature can be accomplished by applying edge detection or other object detection techniques to locate relevant features of the tubular equipment, measuring the distance in the image between relevant features, and then converting that image distance to a. real-world distance (e.g. through stereo vision to measure distance to the object, by a known distance from the camera to the object, or other similar techniques). Non-limiting examples of features capable of being measured by embodiments include external diameter, length, length of threading between tubular equipment, thread pitch/ kind, etc. Other measurements may be relevant for certain types of tubular equipment, such as number of stabilizers, length of certain subsections of the tubular equipment, etc.

In some embodiments, the measurements can be compared to a database of known measurements of oilfield equipment to identify the oilfield equipment going into the borehole.

In some embodiments, the sequence of tools can be compared to a desired or allowed list of equipment to verify that the correct tools have been placed downhole to confirm correct drilling operations, or to detect that an incompatible or undesired arrangement or configuration of equipment is being placed into the borehole, causing an alert or an alarm. In some embodiments, the camera system can detect and identify particular measurements of equipment connected to the borehole, such as the bend angle and/or scribe line of a directional drilling bottom hole assembly (BHA), or the diameter or dimensions of equipment features, such as the number of blades on a drill bit, the size, angles, and positions of stabilizers on a BHA, and the like. In some embodiments, the sequence of tools can be recorded to provide a "pipe tally" indicating the type, quantity, and order that tubular equipment was attached to, and run down a borehole. This pipe tally can be recorded in a database and/or transmitted to offsite locations. The pipe tally can be used with the information regarding the pipes (e.g., length, diameter, distance between tooljoints, etc.) in order to provide depth information, help model the behavior of the drill string downhole, and can be used to ensure that the appropriate number of pipes and other equipment is retrieved from downhole during tripping or other operations. By having the computer vision system and/or one or more other computer systems automatically track and maintain such information regarding the pipes and other equipment (e.g., a BHA) that is included downhole as part of the drill string, and/or retrieved when the drill string is removed, greater accuracy and certainty can be provided.

In some embodiments, the camera system can detect and measure the total length of the drill string by identifying the lengths of pipe attached to the drill string, and adding each length to a cumulative total depth measurement. In some embodiments, this total depth measurement can be combined with other total depth measurements and associated well log data to confirm or improve the accuracy of depth measurements. Such depth information can be used to compare and provide confidence values associated with other depth readings, and can also be used to automatically generate depths associated with surveys taken while drilling. Such a pipe tally database can be coupled to a bit guidance or rig control system, and can be used during drilling to provide a more precise and accurate measured depth and location of the bottom hole assembly and drill bit. In addition, the pipe tally database information can be adjusted for the effects of other parameters, such as temperature, weight on bit, and the like to provide more accurate information about measured depth, the location of the bit and/or the location of the bottom hole assembly (including one or more sensors located in the bottom hole assembly).

In some embodiments, the computer vision system can be used to monitor and determine tripping speeds and such information can be compared with other information to help determine the correct tripping speed. When the drill string is tripped out of the wellbore, the computer vision system can determine the length of the pipe that comes up out of the well, as well as the tooljoints where the pipes are connected to one another, and use this information to determine the length of the drill string tripped out of the wellbore during a set time period.

In some embodiments, the camera system can identify the scribe line of the BHA (which indicates the direction that the BHA will cause the borehole to change direction), and can monitor the direction of the scribe line based on the rotation of the remainder of the drill string. BHAs used in surface-steerable drilling typically have a bend angle. The side of the BHA in the direction of the bend ("scribe line") is an important direction to monitor, as other equipment attached to the BHA, such as MWD components, mud motors, etc., must be aligned with the high side of the BHA. Conventionally, this is done by manually marking the BHA with a grease pen or other marker, and manually aligning each sequential piece of equipment. In some embodiments, computer vision can be utilized to assist in this process.

For example, when the BHA is attached to the drill string, it is bent at a predetermined angle to enable directional drilling. The camera system can take images of the BI-IA and perform feature detection to identify the direction of the bend by, for example, rotating the BHA until the camera detects a maximum bend angle (indicating that the scribe line is perpendicular to the direction the image is taken), and then using that angular position to automatically calibrate the location of the scribe line with other rig equipment, such as the top drive. Embodiments can then monitor the rotation of the drill string and thereby monitor the angular location of the scribe line, and vice versa. Where rotational data is directly available (such as with a rotary table or top drive with a rotation encoder) the location of the scribe line can be monitored by recording the direction of the scribe line relative to the encoder angle (e.g. 90 degrees from the direction the image was taken in the direction of maximum bend). Where such data is not available, rotational data can be monitored by the camera system by taking sequential images of a feature of the drilling rig that is (1) continuously visible, (2) has an identifiable rotational position, and (3) rotates with the drill string. This could be, for example, a. fiducial pattern marked on a rotary table or top drive, or merely tracking some preexisting feature, such as bolt locations or other features, on such drives or other equipment. Once the scribe line is tracked, the camera can assist in the connection of other elements to the BHA, such as MWD components, mud motors, and other devices that must be aligned with the BHA. By using a camera system to monitor the rotation of the drill string, subsequent components of the drill string can be attached, and rotated to correctly align them with the BHA. For example, the computer vision system can monitor the connection operation and determine the relative positions of the BHA and other component. The computer vision system can determine if the two components are out of alignment (e.g., such as if the edge of one component is a distance from an edge of the other component and the distance exceeds a threshold therefor) laterally or because of a relative angle between the two ends of the components to be connected. By monitoring the alignment of the two components, as well as the connection with respect to the proper alignment with the high side of the BHA (such as determined by the scribe line or the like), the computer vision system can help provides greater accuracy and also speed the connection process. In some embodiments, a visual indication, such as a projected image, laser, or augmented reality object, can be provided to an operator to indicate the location of the scribe line to assist in aligning such additional equipment. In addition, the computer vision drilling system may be used to automatically scan and determine the dimensions of the drill bit, BHA, and other drilling equipment, which can be stored in memory and used to generate a 3D model of such equipment. Such a model can be used during drilling operations to more accurately predict the behavior and performance of such equipment during drilling. In addition, the computer vision system can be programmed to obtain such information about the BHA and other downhole components, their size, shape, and dimensions, store this information and/or automatically generate a BHA strap sheet that provides this information visually to a human operator or via a computer file, which can then be used to update the well plan.

In some embodiments, the camera system can also observe and measure the quality and/or integrity of the individual pipes and the connections therebetween. For example, the one or more cameras can observe one or more of the pipes as they rotate, and identify characteristics correlated with a fatigue or potential failure condition, such as the presence of cracks or warping/bending in the pipe. Additionally, the camera system can identify the joints between the pipes, and ensure that each pipe is fully screwed into and seated against each subsequent pipe. If a potentially dangerous condition is detected, such as a defective pipe or defective pipe connection, an alert or alarm can be triggered. For example, an image can be analyzed to determine the boundaries of certain known features to identify portions of the image corresponding to specific features of the equipment. Once a feature is identified, its attributes, such as reflectivity, surface texture, presence or absence of edges within it, etc., can be compared to expected attributes to identify damage. For example, if the tubular equipment is a 90 ft stand of drill pipe, the system can expect that the pipes will only have a certain number of edges, such as the top and bottom of the stand, the left and right side of the pipe (relative to the image), and the two joints between the 3011 lengths. Additional edges detected are likely cracks or other forms of damage in the drill pipe that should be identified. Because the tubular equipment is attached to equipment allowing it to be rotated (e.g. a top drive 136), the tubular equipment can be rotated to enable images to be taken of multiple sides of the equipment to automatically detect potential damage. In the event that any such damage is detected, an alert can be raised to an operator to warn them of the damage. In another example, a drill bit attached to the drill string can be analyzed for damage by measuring surface features (as above), as well as other measurements, such as angles on the teeth of the bit or other visible features to monitor drill bit wear. In some embodiments, hard banding or other types of sacrificial wear material can be present on tubular equipment. Aspects of the present disclosure can also monitor the wear of such banding or other materials determine if such wear is within an acceptable range therefor, and provide an alert if the wear exceeds an acceptable value therefor.

In some embodiments, computer vision can be used to ensure that pipes are operating as intended, or are properly cleaned, such as using the methods described in U.S. Provisional Application 62/689,631, entitled "System and Method for Well Drilling Control Based on Borehole Cleaning," to ensure proper borehole cleaning. For example, an infrared camera can be positioned to view drill pipes prior to their insertion into the borehole. When the pipe is connected to the drill string, and warm drilling mud is pumped through the pipe, the camera can detect variations in thermal transfer into the pipe. That is, places that are thicker due to buildup of drilling residue or other occlusions will warm more slowly, and can be detected by the camera as a cooler region in the pipe. The same system can also be used to detect variations in pipe thickness as a result of damage to the interior surface of the drill pipe, caused by, for example, cavitation or occlusion (e.g. cement not cleared out properly and sticking to the inside of the drill pipe). Even though such damage would not ordinarily be visible from outside the pipe, the infrared camera can detect warmer regions of the pipe caused by thinner wall thicknesses in damaged regions.

In certain embodiments, a computer vision system disclosed herein may detect pipes and joints connecting pipes relative to a rotating head of the drilling rig. In various embodiments, the one or more cameras may observe the rotating head or an area proximate to the rotating head and detect the component (e.g., pipe, joint, etc.) to pass through the rotating head. In various cases, the system may determine the type of component to pass through the rotating head based on a detected characteristic from the computer vision system. As a non-limiting example, a joint may have a larger diameter than the remainder of the pipe, and the system may compare a detected diameter with an expected diameter of the pipe and an expected diameter of the tooljoint to classify the component as a pipe or a joint. In addition, the computer vision system can measure the diameter and length of the tooljoints, and may do so with resolution of less than an eighth of an inch error. Similarly, the computer vision system can monitor and determine the diameters of collars, such as for casing or a liner, and can use information for such collars in much the same way as described for the pipe joints. In addition, the computer vision system can be used to monitor and detect changes or differences in joint diameter size or collar size, and provide appropriate notifications of same. In certain embodiments, based on the identification of the component to pass through the rotating head, the system may perform various control actions. As a non-limiting example, because tooljoints have a larger diameter than pipes, more force may be needed to move the joint through the rotating head (i.e., due to the typically increased resistance to movement through the rotating head). In such cases, without the systems described herein, an untrained operator may not understand that the increased resistance is coming from the rotating head and may instead incorrectly assume that the extra resistance is coming from downhole WOB and thus make an improper correction (e.g., reduce rate of penetration when doing so is unnecessary) based on this incorrect assumption. The systems described herein, on the other hand, can identify the joints relative to the rotating head, which may allow for the system to accurately anticipate increased resistance from the joint passing through the and compensate for that increased resistance accordingly and proactively. By identifying an increased force or resistance as correlated with a tooljoint passing through a rotating head, the computer vision system can provide valuable information to one or more control systems of the drilling rig to avoid an incorrect or unnecessary change in one or more operating parameters (such as reducing WOB or ROP when doing so is not needed).

In some embodiments, the computer vision system can also be used to monitor the alignment of pipes with one another, especially during makeup or break up operations (e.g., connection of two pipes together at a tooljoint by screwing them together). In some situations, the computer vision system may be used to monitor the position of two pipes relative to one another and provide visual or audio assistance in aligning the two pipes, such as for stabbing operations. In addition, the computer vision system can monitor the relative positions of the pipe ends and determine if they are too far out of alignment, such as if the distance between the ends exceeds a threshold value therefor or the two ends are angled relative to one another with an angle that exceeds a threshold therefor. When such a lack of alignment is detected, the computer vision system can provide one or more alerts of the condition and/or can send appropriate control signals to modify or even halt one or more operations.

In some embodiments, the one or more cameras in accordance with the present disclosure can observe auxiliary drilling equipment, such as mud shakers, mud storage tanks, and other equipment. In some embodiments, the one or more cameras can observe the mud shakers, and be used to determine the viscosity of the mud returning out of the borehole. For example, the one or more cameras can observe the mud as it passes across the mud shakers, and by observing the speed with which the fluid and/or solids move across the shaker, can determine the viscosity of the drilling mud. For example, the one or more cameras can identify a relevant feature in the mud returning out of the borehole, such as a specific identifiable cutting, and monitor its velocity across the shaker table. Such a velocity is a function of the shaker speed, screen angle, and viscosity. Where the other attributes are known, viscosity can be determined from that velocity. Viscosity can also be monitored from other features visible to the camera system, such as the speed with which mud separates from and falls off the shaker screen or downstream edge of the shaker. In other examples, the one or more cameras provided herein may utilize and detect one or more secondary references to further improve determination of one or more relevant features of the auxiliary drilling equipment. As a non-limiting example, secondary references may be used on shaker screens to improve the identification of cuttings on the shaker screen and features of the identified cuttings, including but not limited to cutting shape, cutting size, etc. In such examples, the secondary references may include, but are not limited to, a predictable pattern on the shaker screen that is detected by the camera, an intentional pattern on the shaker screen that is detected by the camera, and/or a surface contour or shape of the shaker screen that is detected by the camera. Continuing this example, the detected secondary reference, alone or in combination with other secondary references and/or other known known attributes of the shaker screen (e.g., angle of shaker screen, distance between camera and shaker screen, etc.), may be used by the computer vision system and/or one or more other computer systems to more accurately identify and determine the size (or other attributes) of the cuttings as desired.

Based on the data received by the camera and the determination of one or more states, such as drilling mud viscosity, the types and/or volumes of cuttings, the size of the cuttings, and the like, the computer system can be programmed to determine if one or more corrective actions should be taken and, if so, send one or more control signals to add more drilling mud, increase flow rate, decrease flow rate, add more or stop adding drilling mud additives, adjust one or more shakers or their operation, or take other corrective action. In addition, the information obtained from monitoring the mud system while drilling can be used to monitor and adjust for any potential problems with hole cleaning, such as by providing such information from the computer vision drilling system to a system such as described and shown in U.S., published patent application No. 2019/0309614 A1, published on Oct. 10, 2019, entitled "System and Method for Well Drilling Control Based on Borehole Cleaning," which is hereby incorporated by reference as if fully set forth herein.

In some embodiments, one or more cameras in accordance with the present disclosure can be used to observe the interaction of drilling personnel and/or drilling equipment. For example, object detection techniques can be used to identify relevant locations on the drilling rig, such as the location of hazardous equipment, operator stations and/or the location of human operators. In some embodiments, the locations of certain immobile (relative to the rig) equipment can be manually encoded in such embodiments. By comparing those locations, various safety and performance criteria of the drilling rig can be monitored. For example, a. camera can observe the drilling rig operator to determine whether be is present at his station. In some embodiments, the absence of a driller can generate an alert or alarm, or can cause moving equipment to shut off. In some embodiments, the camera can observe drilling personnel, such as the drilling rig operator, and identify signs of fatigue or inattention, and trigger an alert or warning to prevent dangerous operation of the drilling rig. In some embodiments, if personnel are located in an unsafe proximity to hazardous drilling equipment, an alarm can be sounded, or the equipment can be automatically shut down. In some embodiments, such alerting functionality can be enabled or disabled as a function of the operation of the equipment. For example, when the equipment is not operating or is otherwise in a safe state or mode, no proximity alerts would be generated.

Similarly, in some embodiments, one or more infrared cameras can be used to detect whether drilling personnel are performing their jobs safely and/or efficiently. For example, an infrared camera can monitor the body temperature of one or more drilling workers by observing their facial temperature. In hot weather operations, the system could trigger an alarm or an alert if it observes a drilling employee with an elevated body temperature, indicating illness, or a potential heat-related event (e.g., heat stroke). Likewise, one or more infrared cameras could be used to detect whether drilling personnel are utilizing proper personal protective equipment (PPE). For example, if the system detects heat signatures that appear to be an uncovered head, caused by a missing hardhat, or uncovered hands, indicating missing safety gloves, an alert or alarm can be triggered. Thermal imaging computer vision systems can also be used to detect "hot spots" on personnel that indicate bleeding and automatically generate appropriate alerts. In addition to the use of thermal imaging for such health and safety concerns, the camera system can be used to detect conditions suggesting a state of distress of personnel on the rig. For example, if a person is curled into a fetal position instead of standing, that may indicate distress. If a person is missing a limb or a portion of a limb, that may indicate that the person has suffered a dangerous injury (e.g., amputation) and is at risk of bleeding out if medical attention is not immediately provided. Similarly, different postures may indicate distress, such as a slumped-over position, a prone position, and so forth. In some embodiments, the computer vision system can be programmed so that, when the state of a person on or around the drilling rig site is detected and determined to be a state of distress, an appropriate response can be determined and automatically taken. Such a response may be an alert or warning, may require the shutdown of some or all drilling rig equipment, a change in one or more drilling parameters, and may involve summoning immediate medical attention, such as sending an alert to onsite medical personnel or others on site and/or automatically sending an emergency message to medical personnel, such as EMS, a hospital, a doctor, or the like.

In some embodiments, a computer vision system can be used to detect and monitor individuals within a location on or near a drilling rig and/or its associated equipment. As described above, the computer vision system can be used to detect and monitor personnel and their movements and time spent in various locations. in addition, the computer vision system can be used to detect and identify a person's role, such as by way of visual cues. This could be as simple as the color of the person's hardhat, the number of stripes on their FRCs (Fire Retardant Clothing), buttons, pins, or other items worn by the person, or the computer vision system could be programmed to use facial recognition. In some embodiments, one or more personnel's clothing, gloves, safety glasses, hardhats, hoots, or other apparel could have a distinctive color or other visual characteristic(s), or could have one or more patches, stickers, stripes, reflective material, QR codes, etc. located thereon, each of which could be detected by the computer vision system and used to identify the person or the person's role on the rig. Such information can be used by the computer vision system (and/or one or more other control systems) to monitor and track individual activities and determine if there is a reason for a particular person or a person with a particular role to be where they are currently located. If a. person is located in an area without authorization, or is located somewhere for an extended period, that person could be in an unsafe space that is not justifiable given that their role, the time they have spent there, the training that person may or may not have, the experience that person may or may not have, and the like. In addition, in the event of a safety event at the drilling site, the muster station or team members on location could have digital access to a database to understand quickly where personnel are or were recently located. Such information could be helpful in locating any personnel that is otherwise missing.

In some embodiments, the computer vision system may be used to evaluate individual performance and habits by associating movements to individuals. Once individual tracking can be accomplished, hours worked could be tracked automatically as well for both payroll applications as well as managing breaks. Further, with knowledge of the actual drilling activity during a shift, dynamic break/rest intervals can be established to maximize efficiency while improving safety. For example, for a shift where the rig crew is tripping pipe in and out, the rig crew will need breaks more often than during a shift during which the crew is drilling slowly in a target formation. Additionally, preventative maintenance can be suggested and prioritized based on current and future activity of individuals. All of these approaches can be further enhanced with having personnel wear wearable devices for location information, which can then be accessed and obtained for analysis. By using independent wearables, the computer vision system is not dependent on these additional devices (which may be difficult to maintain), but nonetheless may benefit from the information they may provide. Biometric data can also be integrated into such a system to judge health and fatigue of individual workers.

In some embodiments, similar techniques can be employed to monitor the operating state and/or health of drilling rig equipment. For example, operating temperature can indicate whether a piece of equipment is running. Excessive or inadequate operating temperature can further indicate whether there is a problem with the piece of equipment, such as a. mechanical failure or impending mechanical failure, or whether operating commands are not being received by the equipment from the relevant control panel/system. In addition to monitoring the rig and associated equipment for potential problems due to excessive heat, cold, or other weather conditions, a computer vision system may be used to monitor the rig and its associated equipment for changes in orientation, position, or the like. For example, if a sub unscrews from a BHA while being moved, the computer vision system can detect the event, identify it, and provide an appropriate alert or control signal. The computer vision system can be used to monitor and detect other events to help identify and/or avoid potential equipment failures or other problems. For example, the computer vision system can monitor bolt rotating on a top drive or other piece of equipment, and provide an alert before the bolt unscrews or comes loose. By monitoring the rig and its associated equipment, the computer vision system can essentially inspect the rig site on a continuous basis and compare the current rig state to a prior rig state determined by the computer vision system, thus identifying potentially significant changes to the condition or placement of equipment or to potential failure or problem events.

Besides monitoring the rig and its equipment for potential problems or events that might happen with the rig or the equipment, the computer vision system can monitor the rig and its equipment for potential drilling conditions or events. For example, the computer vision system can receive images from a camera trained on a Kelly hose, and detect and identify movement of the hose and/or vibrations of the hose. Such movements and/or vibrations can be monitored and used to help identify and predict potential drilling conditions or events, such as rough drilling conditions or dysfunction downhole. Such movements and vibrations can also be used to identify and predict problems with the surface pumps and other flow-related equipment and systems.

In some embodiments, the present disclosure can be used to observe drilling personnel on or near the drilling rig or ancillary equipment to ensure safe operation of equipment. For example, the drilling rig may have a pair of slips shaped like wedges that fit around the pipe to hold it in place. Pulling the slips out of drilling floor is typically a two-person operation, but occasionally can be attempted by a single person. A camera system in accordance with the present disclosure can identify and track the number of people in proximity to the slips, and either prevent or warn operators when only a single person is detected attempting to pull up the slips. For example, the system could have the ability to lock the slips in place, which would not disengage unless two people were observed near the slips. Alternatively, a single person could be observed attempting to pull the slips, and an alarm or alert could sound, warning of the dangerous operation. The example of pulling slips is only one example of a dangerous operation that may be performed by personnel. Computer vision systems in accordance with the present disclosure can be used to similarly detect or correct dangerous operations, either due to an incorrect ordering of operations (e.g., attempting to unscrew a drill pipe while under pressure), improper staffing (e.g., one person pulling up the slips), or use of the wrong equipment or tool in order to perform an operation. The computer vision system can also be used to monitor the volume(s) of one or more mud pits, waste pits, pools, etc., and to make sure that they do not fall below or exceed preset thresholds and, if they do, to provide an alert, alarm, or other corrective action. Similarly, the computer vision system can be programmed to monitor and detect off-gassing or other conditions, such as the freezing of mud pumps or other equipment on the surface of motors, mechanical systems, etc. and determine if such conditions are acceptable or not, then send one or more control systems to automatically correct any unacceptable conditions or to provide one or more alerts or alarms if such actions are acceptable to take for the detected conditions.

The data received by processing system 110 from the one or more cameras (not shown) can be analyzed and used, such as by processing system 110, to provide an alert, alarm, or to stop or alter one or more drilling parameters, including ceasing operation of given equipment or stopping drilling operations. In addition, the data received by the computer system can include data from the one or more cameras and from one or more sensors, including downhole sensors, surface sensors, or both. The computer system can be programmed so that the data received by the computer system is analyzed to determine a current state of one or more parameters, compared against one or more threshold limits or determined to be within one or more tolerance limits, and then to generate one or more appropriate signals to provide one or more of an appropriate display, alert, alarm, slow down of drilling, or cessation of one or more drilling activities. In addition, the data received by a computer system can be used to monitor one or more drilling parameters (such as measured depth as noted above), which can then be used to control drilling operations, such as for determining whether and when to begin a slide drilling operation or to continue rotary drilling, for updating a well plan, for increasing or decreasing rate of penetration, weight on bit, or otherwise altering one or more drilling parameters, and the like. The information from the computer vision system can be combined and/or analyzed in combination with the information obtained from any one or more of the other downhole and surface sensors described above. Doing so may provide the ability to compare the information obtained from the computer vision system with that from the other rig systems and sensors, and can be done so that each is provided with a level of corresponding confidence. In some cases where the two sets of information differ by a significant amount, it may be that the one set with the higher confidence value should be used by the rig control systems. Alternatively, the two sets of information could be averaged to provide a combined average value which can then be used by the rig control systems.

Figure 12:
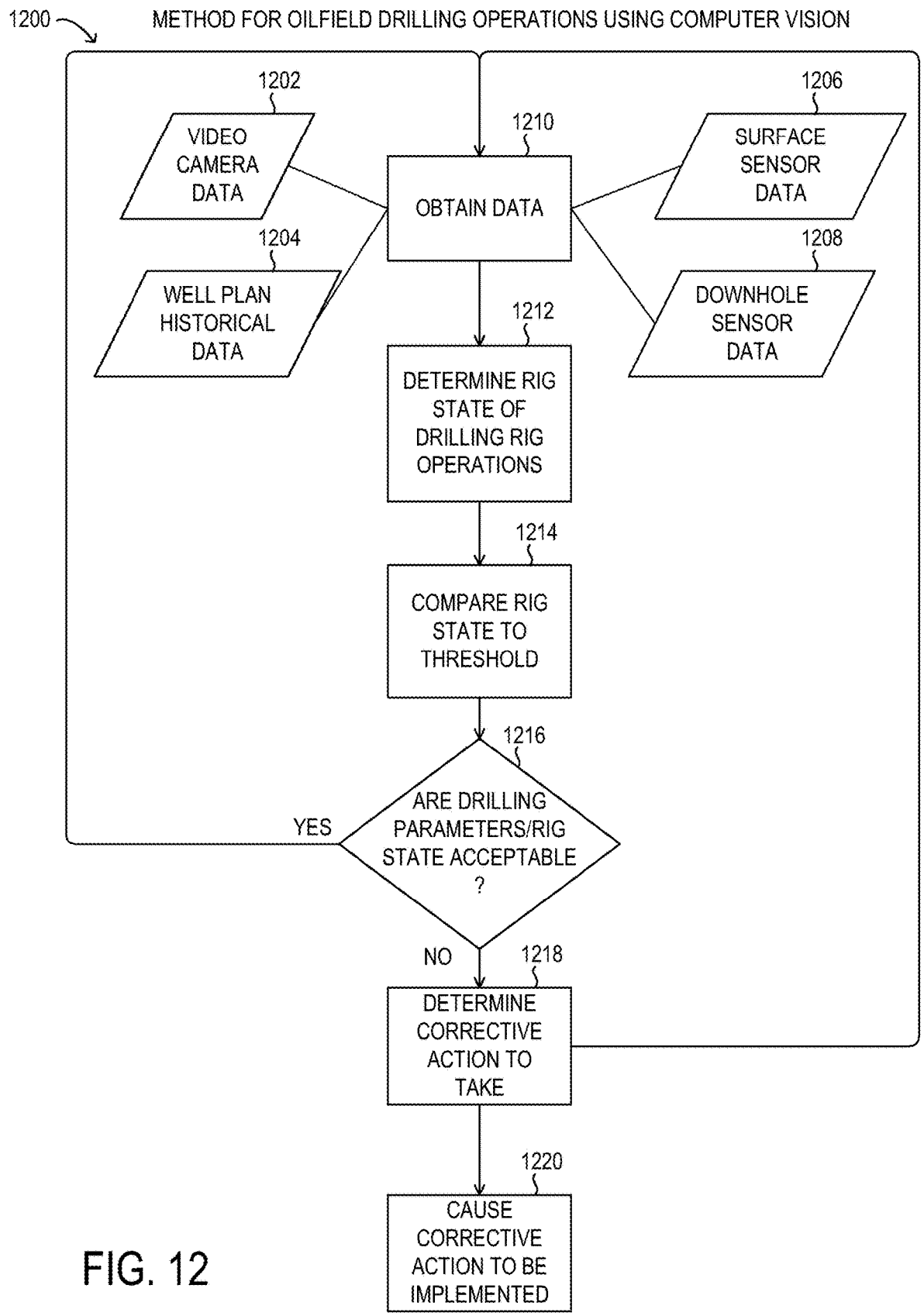
FIG. 12 is a flow chart illustrating a method using computer vision to monitor and correct drilling rig operations as appropriate.

FIG. 12 is an example of a flow chart of a method 1200 for oilfield drilling operations using computer vision that may be implemented by processing system 1100, in accordance with the present disclosure. It is noted that certain operations in method 1200 may be omitted or rearranged in different embodiments.

Method 1200 may begin at step 1210 by obtaining various data from a number of sources, including video camera data 1202 from one or more cameras like those described herein, well plan historical data 1204, surface sensor data 1206, and downhole sensor data 1208. In operation of method 1200, data may be obtained at step 1210 without delay while borehole 108 is being drilled. At step 1212, a rig state of drilling rig operations may be determined. At step 1214, the rig state may be compared to a threshold to determine whether the data obtained in step 1210 is consistent with expected operational data, such as by comparing the data obtained in step 1210 to one or more preset thresholds or limits. At step 1216, a determination may be made whether the drilling rig operations are within acceptable limits. When the result of step 1216 is YES, and the drilling rig operations are within acceptable limits, processing system 1100 may loop back to step 1210 and continue monitoring the drilling rig operations. When the result of step 1216 is NO, and the drilling rig operations are not within acceptable limits, at step 1218, processing system 1100 may determine a corrective action to take. It is noted that processing system 1100 may also determine that no corrective action is indicated at step 1218. At step 1220, processing system 1100 may cause the corrective action to be implemented. It is noted that at step 1220, the corrective action may be automatically performed, such as by sending an alert, sounding or providing an audio and/or visual alarm, and/or by slowing or stopping one or more drilling operations or all drilling operations entirely.

In some embodiments, a map of the drilling rig (or drilling site) may be generated and displayed and the computer vision system may be programmed to generate and display a spatial map that includes a display of each person on the rig (or site), and, if a person is determined to be in an unsafe location or subject to a condition indicated distress, automatically changing the display to provide a visual alert, wherein the visual alert comprises at least one of changing the color of the person on the display, changing the size of the person on the display, changing the size of the location of the person on the display, providing a flashing light on the display, providing a flashing representation of the person on the display, and adding a warning message on the display, and such visual alert(s) may be provided in addition to or in lieu of other corrective actions as described herein. For example, such corrective actions may also include an audible alert in the drilling rig area, a visual alert in the drilling rig area, an electronic message sent to the person, a change in the display of the map, an increase in the speed of the one or more drilling operations, a decrease in the speed of the one or more drilling operations, and a cessation of the one or more drilling operations. The corrective action also may involve summoning medical assistance when needed.

Figure 13:
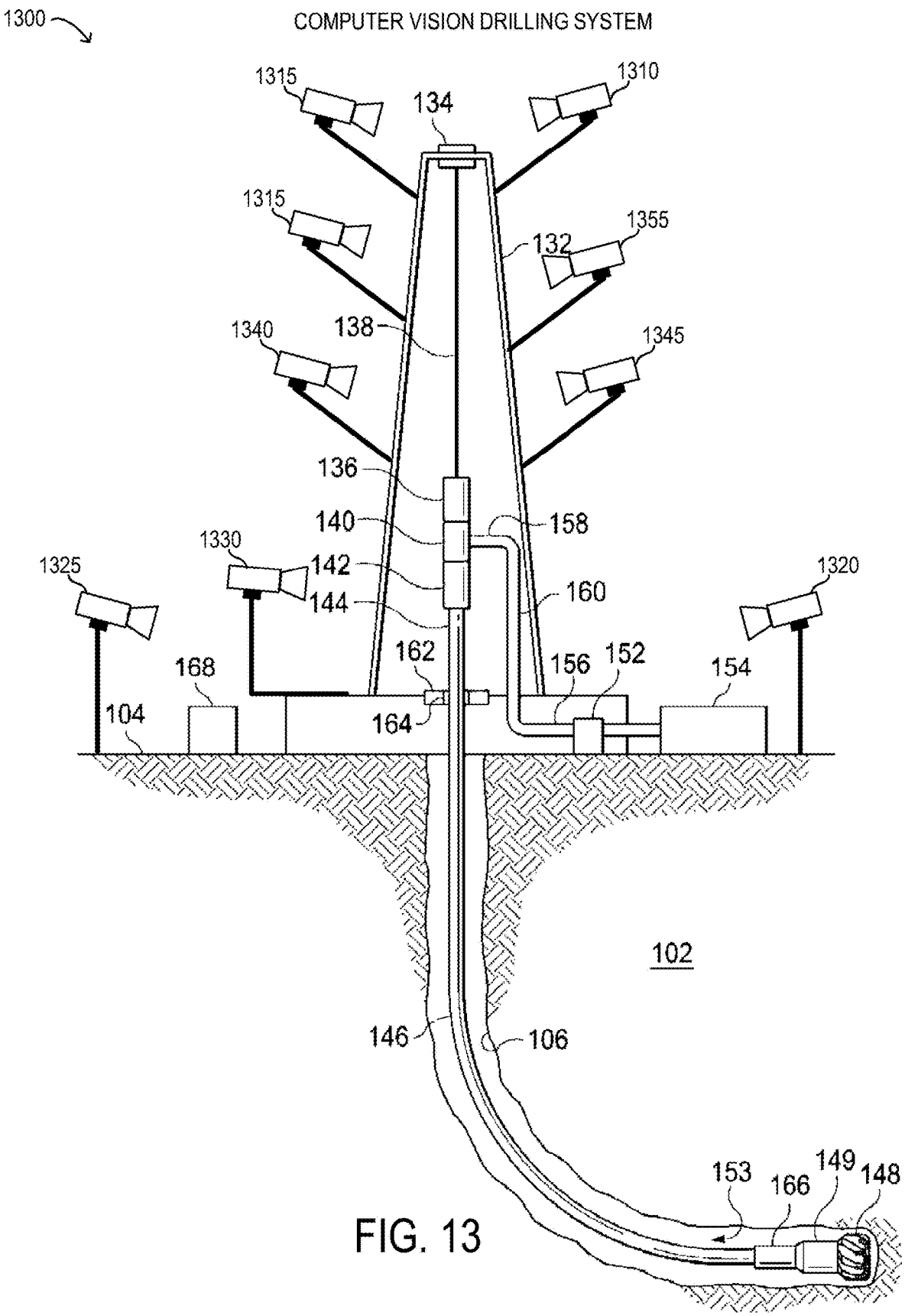
FIG. 13 is a depiction of a computer vision drilling system.

FIG. 13 is a diagram of a computer vision drilling system 1300. System 1300 can be generally very similar to the drilling system 100 shown in FIG. 1, and for convenience like numbered items in FIG. 13 refer to the same items as shown in FIG. 1 and described above. FIG. 13 differs, however, in that the system 1300 shown in FIG. 13 includes several cameras 1310, 1315, 1320, 1325, 1330, 1335, 1340, 1345, 1350, and 1355. As indicated in FIG. 13, each of cameras 1310, 1315, 1320, 1325, 1330, 1335, 1340, 1345, 1350, and 1355 are located at various locations around, on or proximal the system 1300. The cameras 1310, 1315, 1320, 1325, 1330, 1335, 1340, 1345, 1350, and 1355 can be the same type of camera or may be different types. For example, one or all of the cameras may be two-dimensional cameras; alternatively, one or all of the cameras may be three-dimensional cameras. In addition, any one or more of cameras 1310, 1315, 1320, 1325, 1330, 1335, 1340, 1345, 1350, and 1355 may be movably mounted or may be mounted or attached in a stationary position. The field of view of two or more of the cameras 1310, 1315, 1320, 1325, 1330, 1335, 1340, 1345, 1350, and 1355 may overlap with each other, or may include completely separate and distinct areas of the system 1300. The location and orientation of each of the cameras 1310, 1315, 1320, 1325, 1330, 1335, 1340, 1345, 1350, and 1355 may be selected so that the combined field of view of the images from the cameras defines a drilling rig area as desired. The drilling rig area may include only certain portions of the drilling rig or, if desired, may include the entire drilling rig and the drill site, such as may be useful for security purposes in addition to safety and health purposes.

In some embodiments, the cameras 1310, 1315, 1320, 1325, 1330, 1335, 1340, 1345, 1350, and 1355 are movably mounted and are connected to a network, so that the images captured by each of cameras 1310, 1315, 1320, 1325, 1330, 1335, 1340, 1345, 1350, and 1355 can be viewed in a location physically remote from the location of system 1300, such as a central command 414 as shown in FIG. 4, in real time while the borehole 106 is being drilled. In addition, a user may provide input to the network from a location physically remote from the system 1300 to move one or more of the cameras 1310, 1315, 1320, 1325, 1330, 1335, 1340, 1345, 1350, and 1355 during drilling of the borehole 106.

Although FIG. 13 illustrates ten cameras 1310, 1315, 1320, 1325, 1330, 1335, 1340, 1345, 1350, and 1355, it should be noted that less or more cameras may be included in system 1300. In addition, although FIG. 13 illustrates cameras located on or proximal to the derrick 132, the cameras may be located on any one or more of various pieces of equipment, including traveling block 136, top drive 140, drill string 146, mud pump 152, mud pit 154, and any of the other items illustrated and described above.

Still referring to FIG. 13, camera 1310 is shown as positioned proximal the top of the derrick 132. However, it should be understood that, if desired, two or more cameras could be positioned at numerous positions up the derrick 132 from the rig floor, such as cameras 1310, 1315, 1340, 1345, 1350, and 1355. Although shown as essentially pairs of cameras 1310 and 1315, 1340 and 1345, and 1350 and 1355, it is to be understood that the cameras 1310, 1315, 1340, 1345, 1350, and 1350 can be located opposite one another or offset one another as may be desired to obtain overlapping fields of vision and/or to obtain coverage of the field of vision over the entire derrick 132. Doing so should provide images with sufficient resolution for the pipe tally and analysis as described above, as well as for the bottom hole assembly (BHA) analysis as described above. Such cameras or arrays of cameras can be placed at numerous locations around the drilling rig and the drilling site. In addition, one or more cameras may be positioned to provide a birds' eye view above the derrick and positioned to provide a rig floor level view. Doing so should provide images that are sufficient for us to detect, locate, and track the movements of individuals and/or equipment within the drilling rig area (or the drilling site) for detecting unsafe conditions, such as proximity to moving rig components, excessive exposure to extreme weather conditions, anomalous drilling conditions, and the like, and, when such a condition is detected, to determine one or more appropriate corrective actions that can be taken to avoid injury, such as visual and/or audible alerts on the drilling rig, slowing down or speeding up the operation of one or more pieces of equipment (such as to avoid colliding with the person), and stopping one or more drilling operations entirely. Examples of other locations for cameras can include the pipe storage, drilling site generally, and at or around various drilling equipment components. It is expected that it will generally be desirable to provide a plurality of cameras at a plurality of locations, with the cameras and their location and orientation selected to provide overlapping perspectives on at least a plurality of locations within the drilling rig area.

It is also to be understood that cameras 1310, 1320, and 1330 may be selected and positioned in the system 1300 so that they allow the generation of a three dimensional model of the drilling rig area in real time during the drilling of the well, so that the 3D model can be viewed remotely from the drilling site in a virtual reality mode. For example, multiple cameras can be mounted in each of a plurality of camera modules, with the different cameras within each camera module being focused at different widths of image capture. Doing so should allow the capture of multiple images that can be analyzed by the system 1300 to generate stereo imagery. In addition, the different cameras within each camera module can also provide a wide angle view or can provide optical zoom flexibility.

In some embodiments, the one or more of the cameras in the camera module can be controlled remotely by an operator, such as the remote control of the orientation of the cameras 1310, 1320, and 1330 as described above. An operator at a remote location from the drilling site or at the drilling site can control the field of view of multiple cameras by controlling their orientation (e.g., providing a command to the computer vision system from the remote location to direct one or more cameras to pan in one or more directions), and can also control the view or views provided by selecting the one or more cameras within each camera module for viewing. Moreover, the computer vision drilling system may be programmed to allow an operator at the drilling site or at a remote location to control the zooming in or out of one or more of the cameras 1310, 1315, 1320, 1325, 1330, 1335, 1340, 1345, 1350, and 1355. For example, in some cases it may be desirable to zoom in on one or more pieces or equipment or features of the equipment (such as to provide more accurate measurements of the features of the equipment or to better see a feature like any of those described herein), while in other situations it may be desirable to zoom out and provide a wide angle view from one or more cameras 1310, 1315, 1320, 1325, 1330, 1335, 1340, 1345, 1350, and 1355. Such zooming or panning may be controlled by an operator or may be done automatically by the computer vision drilling system.

In some embodiments, such as where data transmission rates to and from a drilling rig site are lower than may be desired, it may be possible to temporarily store at the drilling rig site a plurality of still images captured by the cameras such as a plurality of cameras 1310, 1320, and 1330 at or near the same time. The plurality of still images can then be processed locally at the drilling rig site by the system 1300 to generate a navigable 3D model, such as for VR viewing, and then transmitting the 3D model to a remote location when the data transmission rates are better. Alternatively, the still images can be transmitted to a remote location where they can be processed to generate a 3D model of the drilling rig area for viewing in VR. In the 3D model for viewing in VR (or in any display generated by the system 1300), the design files for the drilling rig (e.g., CAD or similar data tiles) can be used by the system 1300 or the remote system or both (whichever is generating the model) to generate the 3D model superimposing the images on the rig displayed from the design files. The 3D model provided for VR viewing at a remote location can be advantageous for a variety of reasons. Among other things, this allows an operator in the remote location (such one or more command centers) to essentially walk around a rig floor and inspect the drilling rig for safety concerns, maintenance issues, and the like by VR viewing, even if the drilling rig site is physically located in West Texas, North Dakota, or elsewhere in the world, including before, during, or after a well is being drilled. In some embodiments, the camera system can be used to provide virtual perspectives, for example, by creating a synthetic camera view from a position without a camera by combining or synthesizing image data from one or more cameras.

In some embodiments, the 3D model (or a two dimensional display) can be stored automatically by storing multiple images during the drilling of well, such as at predetermined time intervals, predetermined drilling events, or when an operator determines that an image or images should be stored and provides an input to the system to do so. In addition, the time intervals between images stored may vary during drilling, with some time intervals shorter for certain drilling operations or events than others. It should be noted that a 3D image or model may be generated by using images from a plurality of two-dimensional cameras, or by using a 3D camera, or using a combination of 2D and 3D cameras.

In some embodiments, the computer vision system may include instructions for determining a confidence value associated with the determination made by the system. For example, the computer vision system may be programmed to generate and provide or display a confidence value that a person on the rig and the one or more drilling rig components will occupy the same space within a time period (thus indicating a collision is expected). The confidence value may be determined responsive to the consistency of the computer vision results over a series of time intervals (e.g., does the system detect a person in the same place over a series of seconds, minutes, or other time periods, and is that person's location consistent with location determinations over the series of seconds, minutes, or other time periods). The confidence value may also be determined responsive to the consistency of the elements determined by the system over a series of observations, as well as the accuracy and/or resolution of the images obtained by the system. In addition to or in lieu of any of the foregoing, the confidence value may be determined by comparing a determined result of the computer system with one or more results stored in a database and determining the extent to which the determined result matches (or does not match) with one or more results in the database. For example, a determined result that a person on the rig is in an unsafe location may have a low confidence value if the determined results one or two seconds earlier and one or two seconds later do not indicate a person in the same location on the rig. The confidence value may be used by the system, such as to delay taking immediate corrective action that might otherwise be indicated if the confidence value is low and falls below a threshold therefor. Conversely, if the confidence value is high and the determined result is a dangerous condition or medical emergency, the system can be programmed to take immediate corrective action.

It is also worth noting that it is anticipated that the computer vision system will obtain and analyze many images during the drilling of a single well, and many more images during the drilling of multiple wells. During such drilling operations, the system may analyze and determine many measurements from the images. In some embodiments, such images and/or the measurements determined from such images may be stored in a database, and may include images and/or measurements from previously drilled wells and/or from previous portions of the well being drilled. In such embodiments, the images and/or measurements may be statistically analyzed to determine features such as a mean and a standard deviation, and any new measurement (e.g., length of a pipe, diameter of a joint, speed of tripping out, flow volume of cuttings on a shaker, thermal value for mud flow into or out of the wellbore, mud motor bend setting, equipment location, stabilizer profile, mud viscosity, identifier markings, and essentially anything else that is monitored or measured. We believe that the accuracy and confidence in measurements of just about any parameter or physical item measured can be improved with multiple samples and analysis. The use of such information to generate and then compare a measure value to such mean and/or standard deviation values can help determine if the new value is outside an expected range therefor, exceeds an expected or acceptable value therefor, or falls below a minimum value therefor, or the like. Alternatively, or in addition to a statistical analysis, it may be possible to filter the data, such as by looking for gross errors or outlier values that may have been caused by blurred images (such as due to poor weather or light conditions), excessive vibrations, or other issues. By eliminating such outlier values, a better statistical analysis is likely to be provided and can be used for analyzing the data obtained and determined by the computer vision system during drilling. Another approach, which may be used as an alternative or in addition to the foregoing, would be to exclude data values that are above a determined threshold value for the distance from a mean (e.g., fall outside an acceptable range for the measured value).

Yet another approach, which again can be used in combination with or as an alternative to those described, is to prioritize (such as by weighing, either more heavily or less heavily) those measurements captured when drilling operations were stopped (e.g., the pipe is not in motion vertically and is also not rotating, the shaker screen is not shaking, etc.), and assign such values a higher weight in terms of the confidence to be assigned. In addition, it is possible to reduce the confidence weighting assigned to a measurement captured when drilling operations are proceeding apace and there is rapid movement, or when the weather or lighting conditions are poor. When a plurality of cameras provide overlapping coverage of an area, it is also possible to weight the confidence of a determined measurement by a camera that has a preferred vantage point. Different determined values can be assigned confidence values based on a weighting system that accounts for these and other possible conditions. For example, if a determined value seems to provide an erroneous value and does so with a frequency that exceeds a predetermined threshold therefor, the computer vision system may be programmed to determine that this camera is damaged, has an obstructed view, has an occlusion or inclusion, or may be vibrating excessively (such as may be due to mounting issues). In such cases, the computer vision system may provide an alert (such as any one or more of the types of alerts described elsewhere herein).

The computer vision system and/or one or more control systems for the drilling rig and drilling operations described above can also be used to provide additional information that can be used by one or more control systems for the rig and/or a human operator to monitor, plan, control, and modify drilling operations and parameters as appropriate during drilling of a well. The following are additional useful adaptions and implementations of such computer vision systems and methods.

Radial Encoding

In certain aspects, in addition to generally detecting a pipe or other component, the computer vision systems described herein may be able to identify and track a particular pipe or other component using radial encoding, as well as correlate such information with additional information regarding the pipe's use. Such information may be used to predict and avoid failure events, such as, among other things, a failure due to fatigue.

FIGS. 14-17 illustrate an example of a computer vision system 1400, which may be substantially similar to the computer vision system 1300, and includes a plurality of cameras 1405, 1410, 1415, 1420, 1425, 1430, which may be substantially similar to one or more of the cameras of the computer vision system 1300. As such, the prior description of the cameras is equally applicable to the cameras 1405, 1410, 1415, 1420, 1425, 1430 of the computer vision system 1400.

Figure 14:
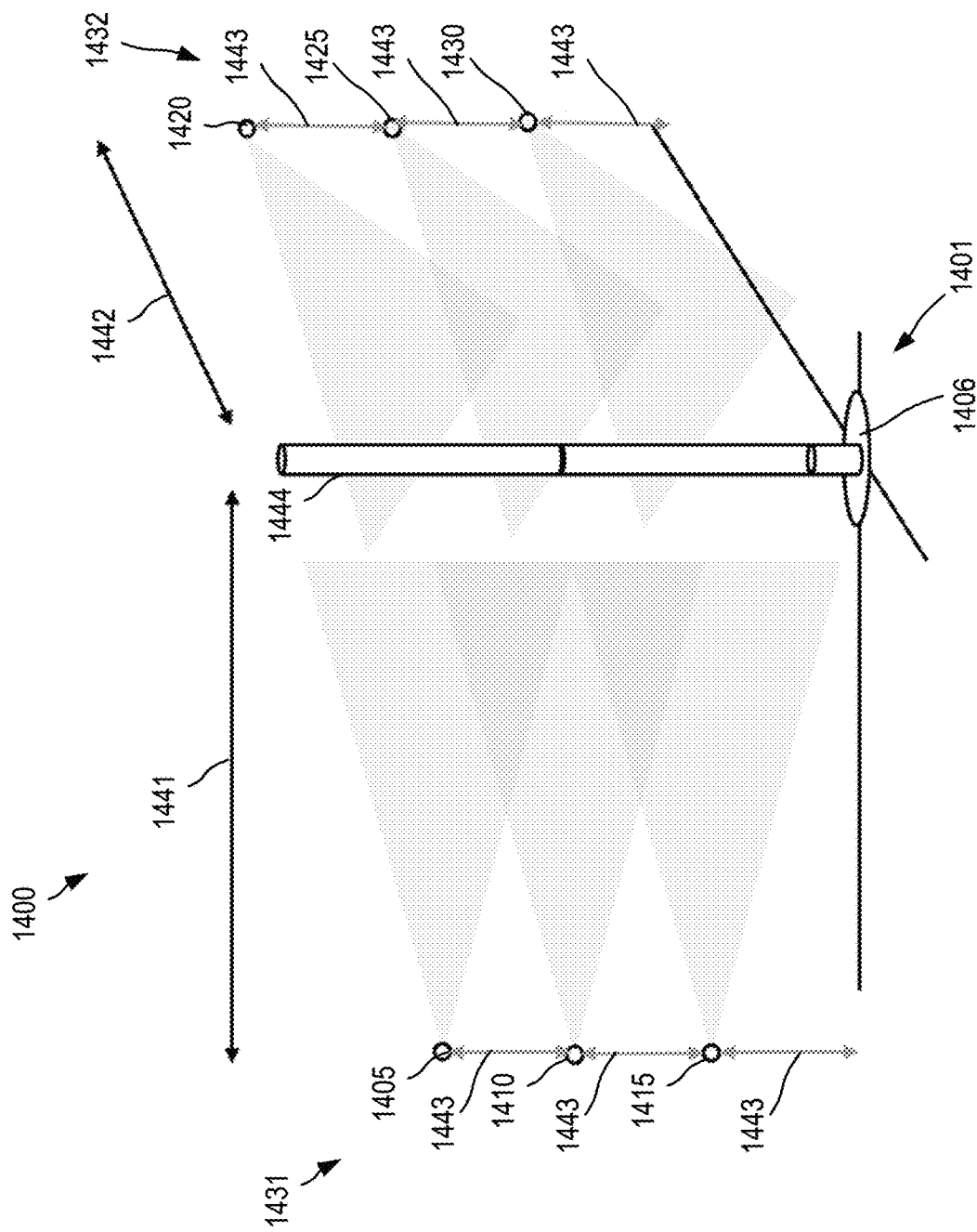
FIG. 14 is a depiction of a computer vision system with range encoding according to an embodiment.

In certain embodiments, the cameras of the computer vision system 1400 may be arranged as a first subset 1431, which may include cameras 1405, 1410, and 1415, and a second subset 1432, which may include cameras 1420, 1425, and 1430. In certain embodiments, the cameras of each of the first subset 1431 and the second subset 1432 may be vertically aligned, and adjacent cameras may be spaced apart by a spacing distance 1443. In the embodiment illustrated in FIG. 14, the spacing distances 1443 are the same, although they vary from one another as desired. As illustrated in FIG. 14, the second subset 1432 is radially offset from the first subset 1431 relative to an area 1401 to be monitored by the computer vision system 1400 by an offset angle. The offset angle between the first subset 1431 and the second subset 1432 may be various angles as desired. In certain embodiments, the offset angle may be less than or equal to 180°, such as less than or equal to 135°, such as less than or equal to 90°, such as less than or equal to 45°, such as less than or equal to 30°, such as less than or equal to 15°. In other examples, the offset angle may be various other angles as desired.

The first subset 1431 may be provided a first predetermined distance 1441 from an area 1401 to be monitored (e.g., a borehole 1406), and the second subset 1432 may be provided a second predetermined distance 1442 from the area 1401 to be monitored. In some embodiments, the first predetermined distance 1441 may be the same as the second predetermined distance 1442, although it need not be in other examples. Moreover, and as discussed in greater detail below with reference to FIG. 18, the distances 1441 and/or 1442 may not be known.

While two subsets are illustrated in FIG. 14, each with three cameras, in other embodiments, additional or fewer subsets may be included, and a particular subset need not include three cameras, but may have more or less than those shown. Moreover, where a plurality of subsets are provided, the number of cameras in one subset need not be the same as the number of cameras in another subset. Additionally, the spacing distance 1443 between cameras of a particular subset and/or between the first subset 1431 and the second subset 1432 may be the same or varied as desired. In certain embodiments, the angle at which the second subset 1432 is radially offset from the first subset 1431 may be adjusted as desired such that the first subset 1431 and the second subset 1432 provide various coverage of the area 1401 as desired.

Figure 15:
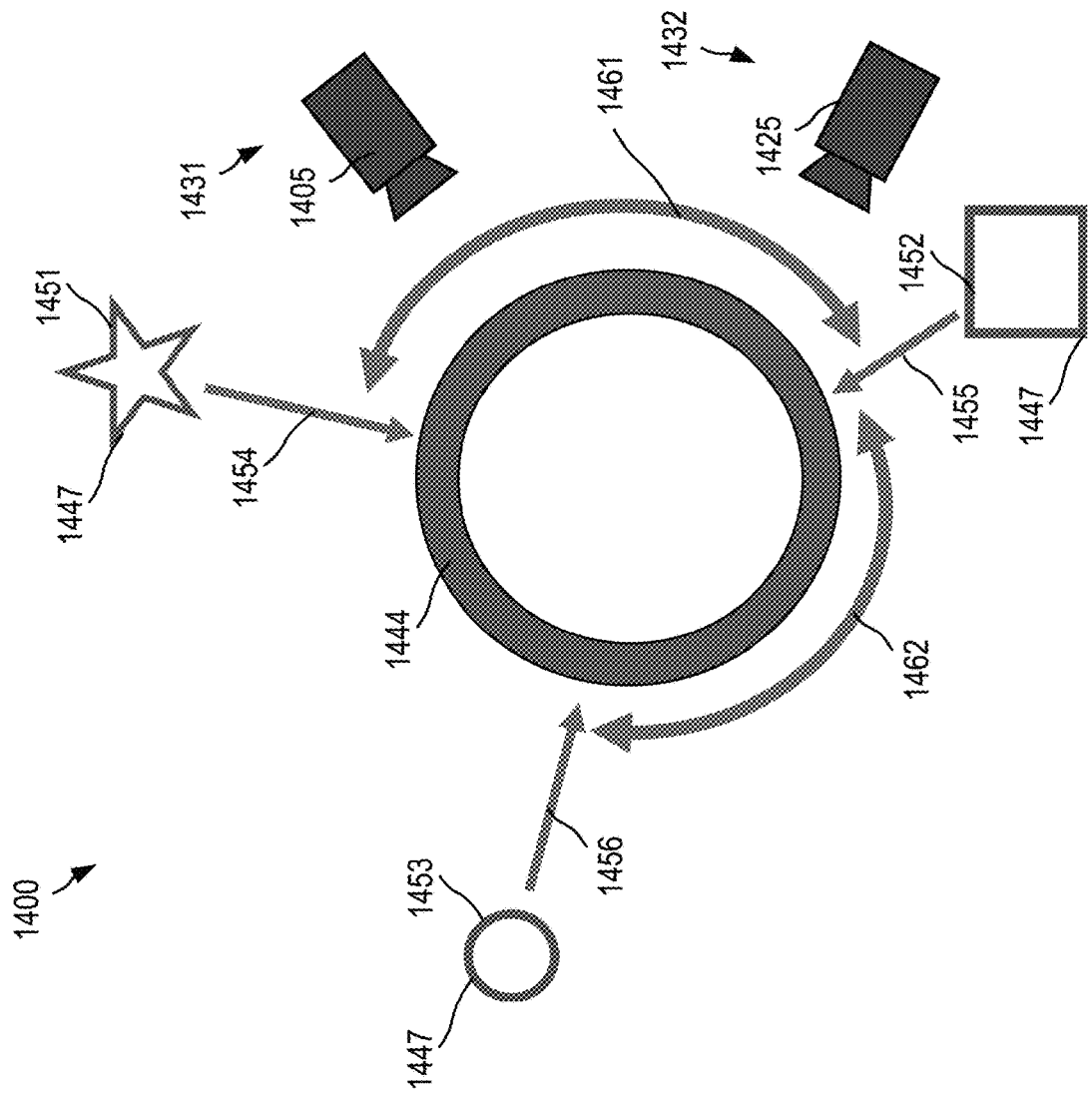
FIG. 15 is a depiction of the computer vision system of FIG. 14.
Figure 16:
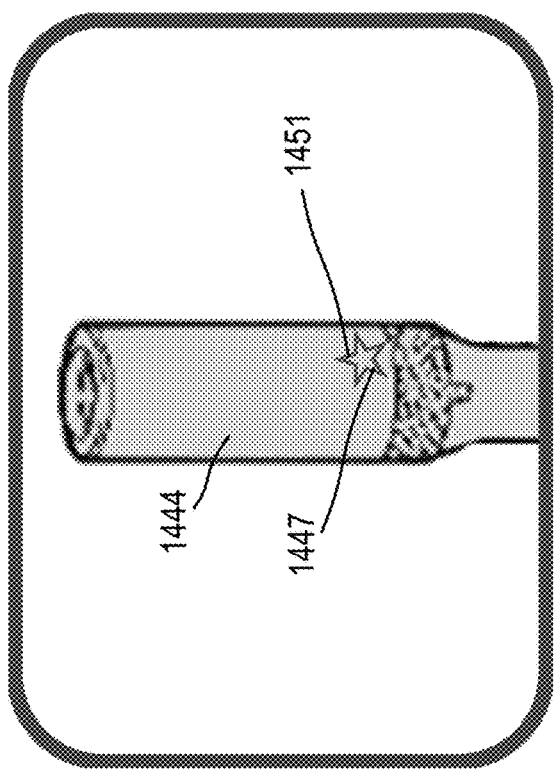
FIG. 16 illustrates a first view of a pipe with radial encoding using the computer vision system of FIG. 14.
Figure 17:
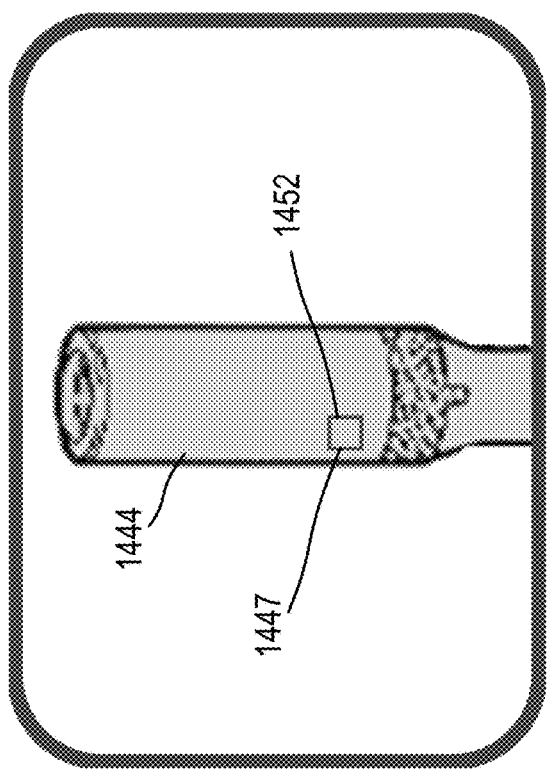
FIG. 17 illustrates a second view of the pipe with radial encoding of FIG. 14.

In the embodiment of FIGS. 14-17, the area 1401 being monitored by the computer vision system 1400 is the borehole 1406 that receives one or more pipes 1444 during a drilling operation (as well as other equipment). As best illustrated in FIG. 15, the pipe 1444 may be radially encoded with one or more detectable characteristics 1447. The detectable characteristics 1447 and/or pattern of detectable characteristics 1447 may be unique for a particular pipe 1444 such that the detectable characteristics 1447 provide an identification for the particular pipe 1444. Non-limiting examples of detectable characteristics 1447 include, but are not limited to, welding patterns, logos, letters (from one or more alphabets), numbers, symbols, shapes, other intentionally placed visual markings detectable by the computer vision system 1400, combinations thereof, or other characteristics as desired. The detectable characteristics 1447 may be provided on the pipe 1444 using various techniques as desired. In some non-limiting examples, the detectable characteristics 1447 may be etched or engraved into the pipe 1444.

In some non-limiting examples, the detectable characteristics 1447 may optionally be low resolution shapes or other markings. In such examples, low resolution shapes or markings may be less susceptible to misreading by the computer vision system 1400 due to surface damage and/or other wear on the surface of the pipes 1444 compared to high resolution characteristics (e.g., a QR code), which may become unreadable with relatively minor damage or wear. In certain embodiments, the unique identification for a particular pipe 1444 using the detectable characteristics 1447 may be provided by controlling one or more of a type of detectable characteristic 1447, a number of detectable characteristics 1447, a radial (or other) pattern of detectable characteristics, a number of unique shapes or characteristics, a number of characteristics per a layer or band, a number of bands or layers of characteristics 1447 along a length of the pipe 1444, a rotation resolution of the characteristics 1447, a radial angle between adjacent detectable characteristics 1447, combinations thereof, or other suitable controls as desired.

In the embodiment of FIGS. 14-17, and as best illustrated in FIG. 15, the pipe 1444 includes radial encoding having three detectable characteristics 1447: a star shape 1451, a square shape 1452, and a circle shape 1453. The arrows 1454, 1455, and 1456 represent the location on the pipe 144 where each of the detectable characteristics 1447 is provided. In addition to having different shapes, the detectable characteristics 1447 provide a unique identification to the pipe 1444 because an angle 1461 between the star shape 1451 and the square shape 1452 is different from an angle 1462 between the square shape 1452 and the circle shape 1453. It is to be noted that the size, angles, and/or spacing of the detectable characteristics may also be varied if desired.

As illustrated in FIG. 15, the subsets 1431, 1432 of the computer vision system 1400 may be arranged to provide various coverage of the perimeter of the pipe 1444. Depending on the rotation orientation of the pipe 1444 relative to the cameras of the subsets 1431, 1432, each subset 1431, 1432 may detect one or more detectable characteristics on the pipe 1444. For example, in the embodiment of FIG. 15 and based on the orientation of the pipe 1444, the first subset 1431 may detect the star shape 1541 (see FIG. 16), and the second subset 1432 may detect the square shape 1452 (see FIG. 17). It will be appreciated that a single subset (e.g., the first subset 1431) may detect more than one detectable characteristics 1447 depending on the orientation of the pipe 1444 and/or the particular pattern of detectable characteristics 1447.

A computer vision system with a processor and memory may receive the visual data from the subsets 1431, 1432 and analyze the visual data to determine and identify the particular detectable characteristics 1447 of a pipe 1444. The computer vision system may further determine a particular identification for the pipe 1444 based on the combination of detectable characteristics 1447. In certain embodiments, the processor may include known information about the computer vision system 1400 to further improve detection and determination of the detectable characteristics 1447 and/or the particular identification of the pipe 1444. Such known information may include, but is not limited to, the predetermined distances 1441, 1442, the spacing distances 1443, the offset angle between the first subset 1431 and the second subset 1432, combinations thereof, or other known aspects of the computer vision system 1400 as desired.

With radial encoding, particular pipes 1444 and/or other components that are radially encoded may be more easily identified and tracked by the computer vision system 1400, which may be used to track and monitor various aspects of a particular pipe 1444. As a non-limiting example, the computer vision system 1400 (and/or one or more additional computer systems) may use the information obtained regarding each pipe joint as follows>The individual pipes, as well as their relative location to other pipes within the drill string, can be tallied and stored in memory. This information regarding the pipes can be correlated with information obtained during drilling, such as the actual downhole hours, actual dogleg exposure, actual RPM, fatigue cycles, actual connection counts, and actual torque exposure for each particular pipe in the drillstring. By tracking such information and correlating it with any failure events, damage, repair, and the like, a mean time between failure can be determined and analyzed for each particular pipe. This information can be used to predict and avoid potential problems and failures, such as by repairing or replacing a pipe that is likely to fail relatively soon. The computer vision system and/or the one or more computer systems can generate and provide one or more appropriate alerts such as any of those described above when a pipe should be repaired or replaced. In extreme cases, the computer vision system and/or control systems may be programmed to automatically alter, modify or even halt one or more drilling operations based on such information. In some embodiments, the radial encoding may improve identification of a particular pipe to be used for a particular customer, region, and/or mud type. In various aspects, the radial encoding may also allow for improved tracking to avoid or minimize potential premature retirement of a pipe or other component.

Although the foregoing discussion focuses on radial encoding embodiments, it should be noted that the present disclosure also includes the use of linear encoding of detectable characteristics on the pipe, either as an alternative to, or in addition to, radial encoding. Such encoding (linear and/or radial) may also be used in combination with (or as an alternative to) the use of any other markings on the pipe as identifiers. For example, a pipe may have one or more grooves, marks, welding features, wear spots, dents, dings, surface finish differences or the like, or combinations thereof, that essentially can act and be used as a unique identifier (e.g., like a fingerprint) for that particular piece of pipe.

Range Estimation

In certain embodiments, a computer vision system may be provided with one or more cameras at an unknown distance (or range) relative to an area to be monitored by the computer vision system. In these embodiments, particularly when the computer vision system includes a single camera or cameras at a single position, the unknown range may introduce error into the detection and determination of various characteristics made by the computer vision system. As a non-limiting example, a computer vision system with a single camera provided at an unknown range may overestimate a length or height of a pipe, which in turn may cause errors with control actions based on the estimated length.

Figure 18:
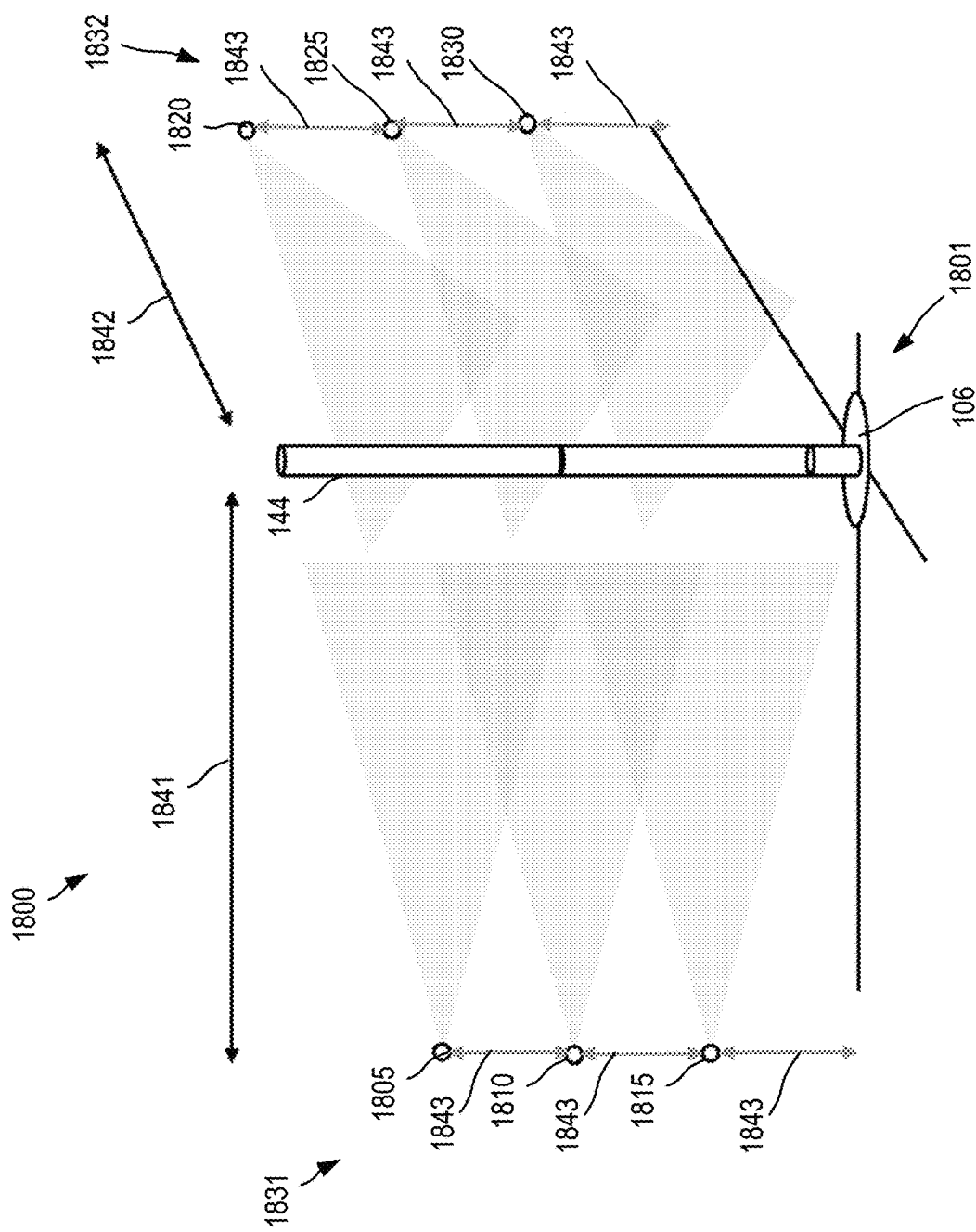
FIG. 18 is a depiction of a computer vision system with range estimation according to an embodiment.

FIG. 18 illustrates an example of a computer vision system 1800 for minimizing potential errors due to an unknown range. The computer vision system 1800 may be substantially similar to the computer vision system 1400 and as shown includes cameras 1805, 1810, 1815, 1820, 1825, and 1830 that are provided in at least two subsets 1831, 1832. In the example illustrated, each subset 1831, 1832 includes three cameras, although in other embodiments the subsets 1831, 1832 may include any number of cameras as desired. Similar to the computer vision system 1400, adjacent cameras in a particular subset may be spaced apart by a spacing distance 1843, which may be the same or different for all cameras within a particular subset and may be the same or different between the subsets. Unlike the computer vision system 1400, a distance 1841 between the subset 1831 and an area 1801 to be monitored (e.g., the borehole 106 receiving the pipe 144) is unknown, and a distance 1842 between the subset 1832 and the area 1801 to be monitored is unknown.

The subset 1832 is offset from the subset 1831 by an offset angle while targeting the same area 1801. In one non-limiting example, the offset angle may be 90°, although in other embodiments the offset angle may be smaller or larger various other angles as desired. The subset 1832 at the offset angle relative to the subset 1831 may allow for an estimation of the range or distances to the area 1801 and may also mitigate potential errors from the estimated range by providing at least two placement regions for the cameras. As a non-limiting example, each subset 1831, 1832 may detect the pipe 144, and the visual data may be sent to a computer vision system. The computer vision system may use the visual data to estimate a location of the pipe 144 as detected by each subset 1831, 1832, and may subsequently use the two estimations to form joint estimation of the pipe 144. The joint estimation of the pipe 144 may be more accurate compared to an estimation based on a single camera and/or subset, which may be susceptible to errors to due to motion in a particular direction, among others.

Calibration

Figure 19:
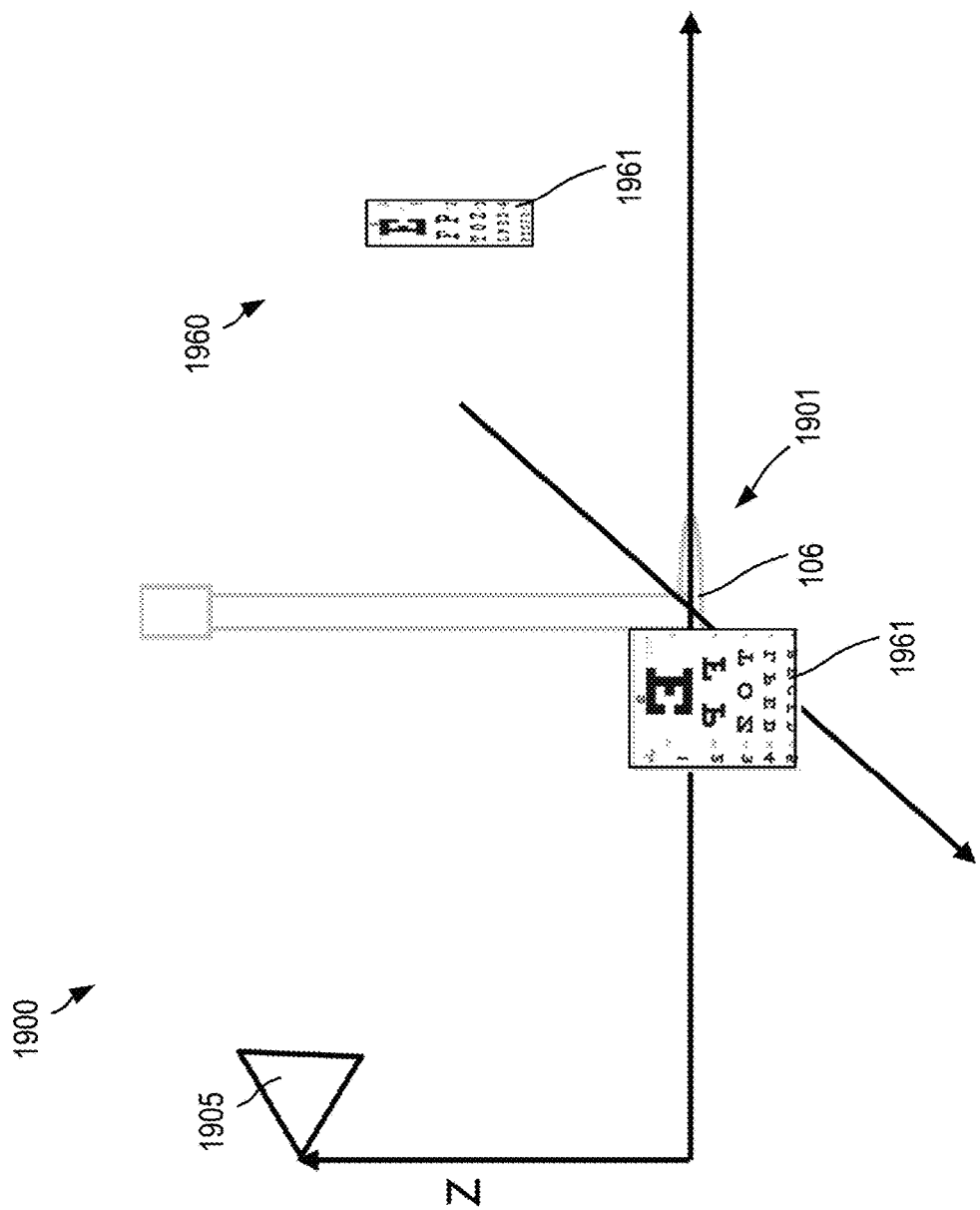
FIG. 19 is a depiction of a computer vision system with a calibration system according to an embodiment.

FIG. 19 illustrates an example of a computer vision system 1900 with a calibration system 1960. The computer vision system 1900 is similar to the previously described computer vision systems and includes at least one camera 1905, which may be substantially similar to the previously described cameras.

The calibration system 1960 includes one or more calibration objects 1961 that are visible within an area 1901 being monitored by the camera 1906. Each calibration object 1961 may be positioned with a predetermined orientation and position relative to a fixed location within the area 1901. The one or more calibration objects 1961 may be constructed from various materials as desired. In some non-limiting examples, the one or more calibration objects 1961 may be constructed from composites or other suitable materials to minimize temperature variations. The at least one camera 1905 of the computer vision system 1900 may use the calibration objects 1961 as targets to estimate a position and/or pose of the at least one camera. 1905. In some cases, the calibration objects 1961 include various identifiers or features that may further assist with calibration of the camera 1905 to further improve estimation of position and/or pose. As a non-limiting example, a calibration object 1961 may include an image that is visible only in certain poses or positions and/or may provide a unique identification when the camera is properly calibrated. The calibration objects 1961 may include various other features as desired to improve calibration of the computer vision system 1900.

In some embodiments, it may be useful to use a component or feature with a known size, shape, pattern, or surface contour or the like for purposes of calibration. For example, the system 1900 could use the geometry and known size of shaker screen to help determine the size and shape of the cuttings on the screen. In some cases, the screens could have one or more distinct lines, markings or protrusions of a known size and/or shape, which can be used by the system for a measurement reference. Similarly, a predictable pattern or contour on the shaker screen or the shaker with a known size/shape could be used as a reference guide. This approach also be applied to other types of drilling equipment. For example, certain pieces of equipment will have logos or other markings of a specific size and/or shape, and that known size and/or shape can be provided to the system for use as a reference guide for determining the size and/or shape of other equipment or features. In some cases, the combination of features on a rig (such as when a new item is welded to a portion of the rig) can be of a known size or shape and thus used by the computer vision system as a reference guide for determining the size and/or shape of other items or features of the rig and equipment. In addition, the equipment can be provided with patterns or other reference items of a known shape or size (such as by using stickers, painting, welding, adhesives, or other fastening means) and those reference items can be used by the computer vision system for more accurately determining the shape and/or size of other items or features.

Occlusion Control

Figure 20:
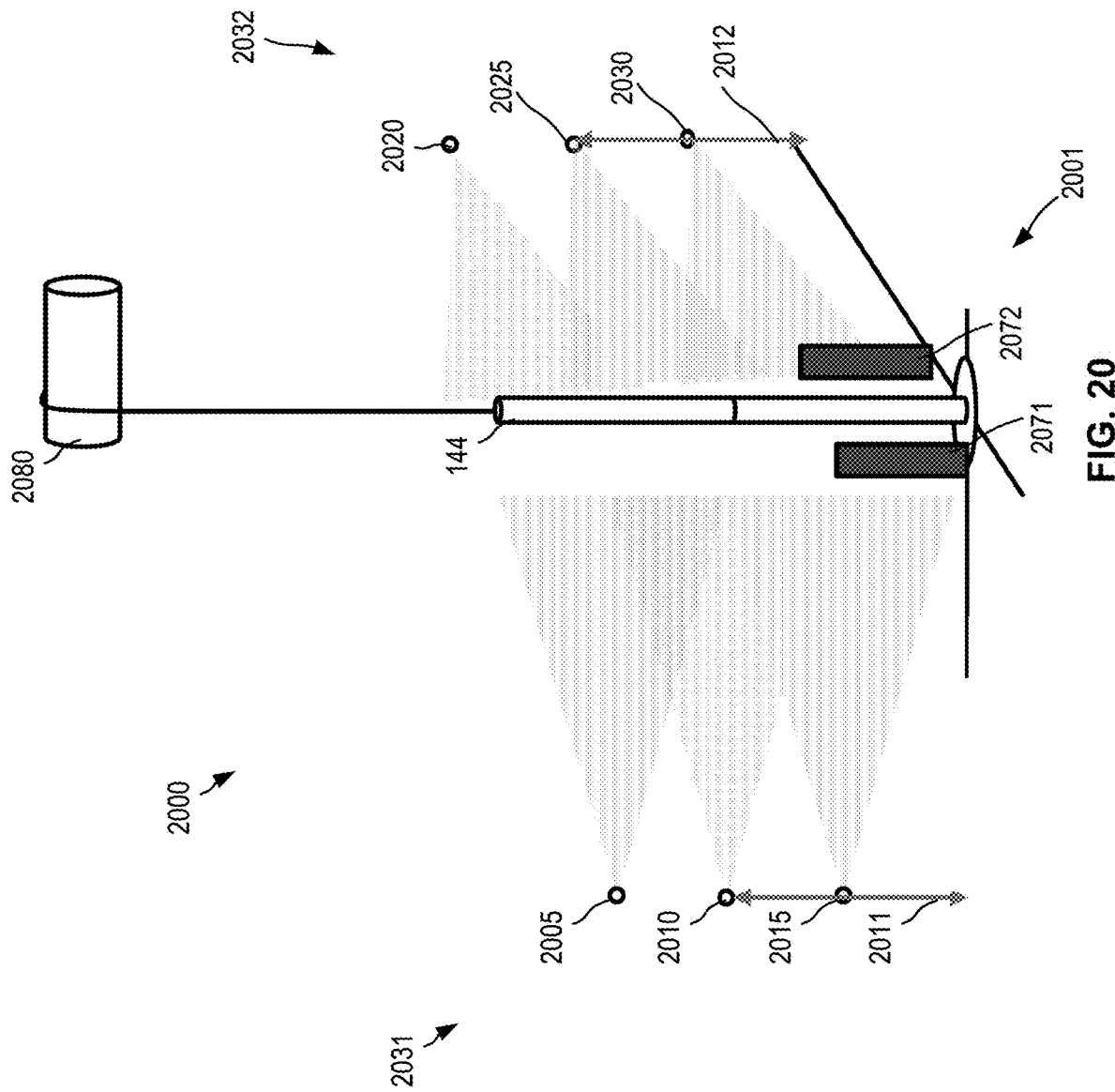
FIG. 20 is a depiction of a computer vision system according to an embodiment.

FIG. 20 illustrates an embodiment of a computer vision system 2000 that is substantially similar to the computer vision system 1800 and includes cameras 2005, 2010, 2015, 2020, 2025, and 2030 that are provided in two subsets 2031, 2032. In certain embodiments, an obstruction (e.g., an object or person) may obstruct the view of a pipe 144 or other component that is being monitored by a computer vision system 2000. In certain embodiments, various mitigation strategies may be employed by the computer vision system 2000 depending on the number and type of obstruction.

In certain embodiments, a single obstruction may be mitigated by using another camera to make the detection. For example, an obstruction blocking the view of a camera that would be used to detect a height of a pipe may be mitigated by using the view from another camera (that is not obstructed) to detect the height of the pipe. However, in some cases, more than one obstruction may be present obstructing a plurality of cameras of the computer vision system 2000. For example, FIG. 20 illustrates a first obstruction 2071 that is at least partially blocking the view of the camera 2015 (represented by arrow 2011) and a second obstruction 2072 that is at least partially blocking the view of the camera 2030 (represented by arrow 2012) relative to an area 2001 being monitored by the computer vision system 2000. In this embodiment, the computer vision system 2000 may perform the detection of the pipe or other object at a location above the height of the obstruction. In another embodiment, the computer vision system 2000 may use previously detected information or measurements to calibrate a wheel-encoder 2080 to pipe length or distance, and may subsequently use the wheel-encoder 2080 to make a measurement (e.g., determine a length) when a pipe or other component is detected but at least partially obstructed.

Joint Length Determination with Obstructed Joint End

Figure 21:
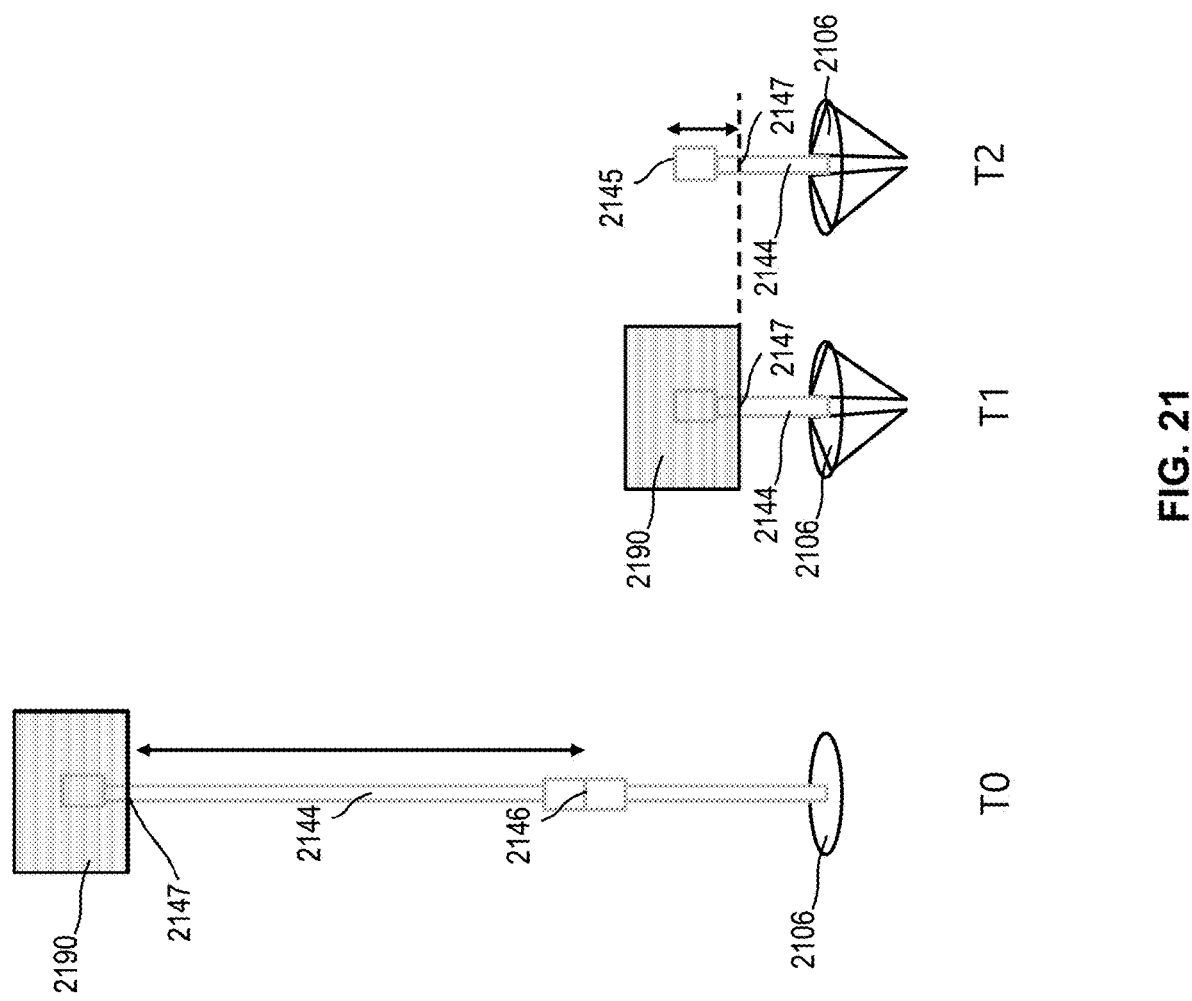
FIG. 21 illustrates steps for determining a joint length with an obstructed joint end using a computer vision system according to an embodiment.

In certain embodiments, it may be desirable to determine a pipe joint length, but a. top-drive/elevator may be opaque or otherwise obstruct a portion of the joint such that the entire joint is not within a field of view of a camera of a computer vision system. FIG. 21 illustrates an example of a top-drive 2190 that is positioning a joint 2144 in a borehole 2106, and as illustrated, a joint end 2145 of the joint 2144 is obstructed from view of the camera by the top-drive 2190 in an initial position (T0). Moreover, once the joint 2144 is inserted into the borehole and the joint end 2145 is exposed (T2), the remaining portion of the joint 2144 is within the borehole 2106 and is not visible to a camera of the computer vision system. In embodiments such as this, the computer vision system may determine a length of the joint 2144 by (i) measuring a distance from a joint start 2146 to a predetermined point 2147 on the joint 2144 corresponding to a bottom of the top-drive 2190 (T0), (ii) allowing the top-drive to move the joint 2144 into the borehole 2106 such that the joint start 2146 is no longer visible (T1), and (iii) after the top-drive 2190 disengages the joint 2144, measuring a distance from the predetermined point 2147 to the joint end 2145. The joint length may be determined by adding together the measurements made in steps (i) and (iii).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A computer vision system comprising:
at least one first camera and at least one second camera, each trained on a location corresponding to a well borehole, wherein the at least one first camera is a first distance away from the location and the at least one second camera is a second distance away from the location, wherein the at least one second camera is radially offset from the at least one first camera by an offset angle, wherein the offset angle is greater than 0° and less than 90°, and wherein the at least one first camera and the at least one second camera are configured to obtain a plurality of images during drilling of a well borehole;
a computer vision processor coupled to the at least one first camera and the at least one second camera and adapted to:
process the plurality of images obtained by the at least one first camera and the at least one second camera;
detect a pipe within the location and encoding on the pipe and estimate a location of the pipe by:
forming a first estimate of the location of the pipe based on at least one of the plurality of images from the at least one first camera;
forming a second estimate of the location of the pipe based on at least one of the plurality of images from the at least one second camera; and
forming a joint estimation of the location of the pipe based on the first estimation and the second estimation; and
determine a unique identification of the detected pipe based on the detected encoding.

2. The computer vision system of claim 1, wherein the encoding comprises a radial encoding of the pipe with a plurality of detectable characteristics on the pipe, and wherein the computer vision processor is adapted to determine the identification of the detected pipe responsive to the detected radial encoding.

3. The computer vision system of claim 2, wherein the detectable characteristics comprise a plurality of one or more of letters, numerals, symbols, geometric shapes, a pattern of geometric shapes, a plurality of bands of shapes, a plurality of shapes within a single band, an angle between adjacent shapes, or combinations thereof.

4. The computer vision system of claim 1, wherein the encoding comprises etching or engraving on an exterior surface of the pipe.

5. The computer vision system of claim 1, wherein the computer vision processor is further adapted to generate and update a pipe tally for a plurality of pipes, wherein the pipe tally identifies each of the plurality of pipes based on the encoding thereon, and wherein the pipe tally further comprises information associated with a time period during which each of the plurality of pipes is located within the borehole.

6. The computer vision system of claim 1, wherein the at least one first camera comprises a plurality of first cameras and the at least one second camera comprises a plurality of second cameras.

7. The computer vision system of claim 6, wherein each first camera is vertically spaced apart from an adjacent first camera by a first spacing distance, wherein each second camera is vertically spaced apart from an adjacent second camera by a second spacing distance, and wherein the first spacing distance is the same as the second spacing distance.

8. The computer vision system of claim 1, wherein the computer vision processor is further adapted to:
correlate information obtained during drilling with the identified pipe, wherein the information obtained during drilling comprises at least one of the following: time downhole, dogleg exposure, revolutions per minute, fatigue cycles, connection counts, and torque exposure.

9. The computer vision system of claim 8, wherein the computer vision processor is further adapted to:
correlate the information obtained during drilling with a plurality of identified pipes;
determine a mean time between failure responsive to the information correlated with a plurality of identified pipes and a plurality of failure events; and
generate an alert relating to repair or replacement of the identified pipe responsive to the determined mean time and the correlated information for the identified pipe.

10. A method of tracking pipes for a drilling operation with a computer vision system, the method comprising:
receiving a first plurality of images from at least one first camera trained on a location corresponding to a well borehole during drilling of the borehole, wherein the at least one first camera is a first distance away from the location and at least one second camera is a second distance away from the location, and wherein the first and second distances differ from one another;
receiving a second plurality of images from the at least one second camera trained on the location and during the drilling, wherein the at least one second camera is radially offset from the at least one first camera by an offset angle;
detecting a pipe within the location based on the first plurality of images and the second plurality of images;
detecting encoding on the detected pipe based on the first plurality of images and the second plurality of images;
determining a unique identification of the detected pipe responsive to the detected encoding and based on at least one of a type of shape in the detected encoding, a size of a shape in the detected encoding, a spacing between shapes in the detected encoding, or an angle between shapes in the detected encoding; and
estimating a location of the detected pipe by:
forming a first estimate of the location of the pipe based on at least one of the plurality of images from the at least one first camera;
forming a second estimate of the location of the pipe based on at least one of the plurality of images from the at least one second camera; and
forming a joint estimation of the location of the pipe based on the first estimation and the second estimation.

11. The method of claim 10, wherein receiving the first plurality of images comprises receiving the first plurality of images from a plurality of first cameras, and wherein receiving the second plurality of images comprises receiving the second plurality of images from a plurality of second cameras.

12. The method of claim 10, wherein identifying comprises identifying responsive to at least one of a predetermined number of letters, numerals, symbols, shapes, or combinations thereof, a predetermined pattern of different letters, numerals, symbols, shapes, or combinations thereof, a predetermined number of bands of letters, numerals, symbols, shapes, or combinations thereof along a length of the pipe, and a predetermined number of letters, numerals, symbols, shapes, or combinations thereof within a single band, or an angle between adjacent letters, numerals, symbols, shapes, or combinations thereof.

13. The method of claim 10, further comprising generating an alert or a control response based on the identification of the detected pipe.

14. The method of claim 13, wherein generating the control response comprises updating a work history of the detected pipe.

15. The method of claim 13, wherein generating the control response comprises comparing one or more features of the work history of the pipe to an expected useful life of the pipe, and generating the alert responsive to a comparison when the one or more features are within a predetermined threshold based on the expected useful life of the pipe.

16. The method of claim 10, further comprising:
correlating information obtained during drilling with the identified pipe, wherein the information obtained during drilling comprises at least one of the following: time downhole, dogleg exposure, revolutions per minute, fatigue cycles, connection counts, and torque exposure.

17. The method of claim 16, further comprising:
determining a mean time between failure responsive to the information correlated with a plurality of identified pipes and a plurality of failure events; and
generating an alert relating to repair or replacement of the identified pipe responsive to the determined mean time and the correlated information for the identified pipe.

* * * * *